United States Patent
Sage

(10) Patent No.: US 7,971,225 B2
(45) Date of Patent: Jun. 28, 2011

(54) BANDPASS COMPONENT DECIMATION AND TRANSMISSION OF DATA IN CABLE TELEVISION DIGITAL RETURN PATH

(75) Inventor: Gerald Francis Sage, Chico, CA (US)

(73) Assignee: Finisar Corporation, Sunnyvale, CA (US)

( * ) Notice: Subject to any disclaimer, the term of this patent is extended or adjusted under 35 U.S.C. 154(b) by 2626 days.

(21) Appl. No.: 10/218,344

(22) Filed: Aug. 12, 2002

(65) Prior Publication Data

US 2003/0154494 A1 Aug. 14, 2003

Related U.S. Application Data

(60) Provisional application No. 60/355,023, filed on Feb. 8, 2002.

(51) Int. Cl.
*H04N 7/173* (2011.01)
*H04N 5/00* (2011.01)
(52) U.S. Cl. ......... 725/121; 725/122; 725/124; 348/608
(58) Field of Classification Search ........... 725/105–134
See application file for complete search history.

(56) References Cited

U.S. PATENT DOCUMENTS

| | | | | |
|---|---|---|---|---|
| 4,048,443 A | * | 9/1977 | Crochiere et al. | 704/206 |
| 4,757,390 A | * | 7/1988 | Mehrgardt et al. | 348/453 |
| 4,974,236 A | * | 11/1990 | Gurcan et al. | 375/301 |
| 5,014,309 A | | 5/1991 | West, Jr. | |
| 5,113,189 A | | 5/1992 | Messer et al. | |
| 5,142,690 A | | 8/1992 | McMullan, Jr. et al. | |
| 5,155,590 A | | 10/1992 | Beyers, II et al. | 358/86 |
| 5,208,854 A | | 5/1993 | West, Jr. | |
| 5,225,902 A | | 7/1993 | McMullan, Jr. | 358/86 |
| 5,235,619 A | | 8/1993 | Beyers, II et al. | |
| 5,243,651 A | | 9/1993 | Parikh et al. | |
| 5,245,420 A | | 9/1993 | Harney et al. | |
| 5,247,364 A | | 9/1993 | Banker et al. | 358/191.1 |
| 5,251,324 A | | 10/1993 | McMullan, Jr. | |

(Continued)

FOREIGN PATENT DOCUMENTS

EP 0748120 A1 * 12/1996

(Continued)

OTHER PUBLICATIONS

U.S. Appl. No. 10/102,619, Mail Date Apr. 29, 2008, Non-Final Rejection.

(Continued)

*Primary Examiner* — Christopher Kelley
*Assistant Examiner* — Randy Flynn
(74) *Attorney, Agent, or Firm* — Maschoff Gilmore & Israelsen

(57) ABSTRACT

A device for and a method of decreasing the data rate of a digital return path link in a Cable Television Hybrid Fiber-Coax system (CATV system) is disclosed. At the node of the CATV system, the bandwidth of the a digital data stream representative of an analog return signal is limited to a desired frequency band. The bandwidth-limited data stream is then digitally re-sampled at a predetermined multiple of a center frequency of the frequency band. The re-sampled data stream is then separated into two data streams. Then, these separate data streams are digitally decimated to a lower data rate, interleaved and serialized for transmission to a head end of the CATV system. A reverse process reconstructs the original analog return signal's signal components within the desired frequency band at the head end.

16 Claims, 22 Drawing Sheets

U.S. PATENT DOCUMENTS

| | | | |
|---|---|---|---|
| 5,255,086 A | 10/1993 | McMullan, Jr. et al. | |
| 5,282,019 A * | 1/1994 | Basile et al. | 348/488 |
| 5,301,028 A | 4/1994 | Banker et al. | 348/570 |
| 5,303,295 A | 4/1994 | West et al. | |
| 5,317,391 A | 5/1994 | Banker et al. | 348/6 |
| 5,319,454 A | 6/1994 | Schutte | |
| 5,323,462 A | 6/1994 | Farmer | |
| 5,357,276 A | 10/1994 | Banker et al. | 348/7 |
| 5,430,568 A | 7/1995 | Little et al. | 359/124 |
| 5,442,472 A | 8/1995 | Skrobko | 359/110 |
| 5,497,187 A | 3/1996 | Banker et al. | 348/6 |
| 5,499,241 A | 3/1996 | Thompson et al. | 370/73 |
| 5,505,901 A | 4/1996 | Harney et al. | |
| 5,539,822 A | 7/1996 | Lett | 380/20 |
| 5,581,555 A | 12/1996 | Dubberly et al. | 370/487 |
| 5,594,726 A | 1/1997 | Thompson et al. | 370/485 |
| 5,719,867 A | 2/1998 | Borazjani | 370/436 |
| 5,719,872 A | 2/1998 | Dubberly et al. | 370/487 |
| 5,826,167 A | 10/1998 | Jelinek et al. | 455/5.1 |
| 5,854,703 A | 12/1998 | West, Jr. | 359/167 |
| 5,930,231 A | 7/1999 | Miller et al. | 370/210 |
| 5,949,485 A * | 9/1999 | Oh | 375/240.1 |
| 5,963,352 A | 10/1999 | Atlas et al. | 359/161 |
| 5,963,557 A * | 10/1999 | Eng | 725/126 |
| 6,091,932 A * | 7/2000 | Langlais | 725/125 |
| 6,161,011 A | 12/2000 | Loveless | 455/426 |
| 6,272,150 B1 | 8/2001 | Hrastar et al. | 370/486 |
| 6,279,158 B1 * | 8/2001 | Geile et al. | 725/126 |
| 6,356,369 B1 | 3/2002 | Farhan | 359/125 |
| 6,356,374 B1 | 3/2002 | Farhan | |
| 6,373,611 B1 | 4/2002 | Farhan et al. | |
| 6,417,949 B1 | 7/2002 | Farhan et al. | 359/173 |
| 6,433,906 B1 | 8/2002 | Farhan | 359/167 |
| 6,437,895 B1 | 8/2002 | Farhan et al. | 359/180 |
| 6,449,071 B1 | 9/2002 | Farhan et al. | 359/125 |
| 6,457,178 B1 | 9/2002 | Slim | 725/127 |
| 6,462,851 B1 | 10/2002 | West, Jr. | |
| 6,493,005 B1 * | 12/2002 | Wu | 715/804 |
| 6,519,067 B2 | 2/2003 | Farhan et al. | 359/180 |
| 6,523,177 B1 | 2/2003 | Brown | 725/121 |
| 6,622,281 B1 | 9/2003 | Yun et al. | |
| 6,724,439 B1 * | 4/2004 | Horwitz | 348/724 |
| 6,751,269 B1 | 6/2004 | Shalvi et al. | |
| 6,956,911 B2 | 10/2005 | Ohashi | |
| 2002/0073434 A1 * | 6/2002 | Pience | 725/130 |
| 2002/0131426 A1 * | 9/2002 | Amit et al. | 370/401 |
| 2003/0016701 A1 * | 1/2003 | Hinson | 370/480 |

FOREIGN PATENT DOCUMENTS

| | | |
|---|---|---|
| WO | WO 00/60871 | 12/2000 |

OTHER PUBLICATIONS

U.S. Appl. No. 10/102,619, Mail Date Dec. 8, 2008, Final Rejection.
U.S. Appl. No. 10/102,619, Mail Date Jul. 24, 2009, Non-Final Rejection.
U.S. Appl. No. 10/102,619, Mail Date Mar. 15, 2010, Office Action.
U.S. Appl. No. 10/102,619, Mail Date Aug. 17, 2010, Office Action.

* cited by examiner

BANDPASS COMPONENT DECIMATION AND TRANSMISSION OF DATA IN CABLE TELEVISION DIGITAL RETURN PATH

The present application claims priority to, under 35 U.S.C. §119(e), U.S. Provisional Patent Application 60/355,023, filed Feb. 8, 2002, which is incorporated herein by reference.

BRIEF DESCRIPTION OF THE INVENTION

The present invention relates generally to cable television systems (CATV). More specifically, the present invention pertains to a method and system for lowering the data rate of digital return path links for a CATV hybrid fiber coax system.

BACKGROUND OF THE INVENTION

Cable television systems (CATV) were initially deployed so that remotely located communities were allowed to place a receiver on a hilltop and to use coaxial cable and amplifiers to distribute received signals down to the town that otherwise had poor signal reception. These early systems brought the signal down from the antennas to a "head end" and then distributed the signals out from this point. Since the purpose was to distribute television channels throughout a community, the systems were designed to be one-way and did not have the capability to take information back from subscribers to the head end.

Over time, it was realized that the basic system infrastructure could be made to operate two-way with the addition of some new components. Two-way CATV was used for many years to carry back some locally generated video programming to the head end where it could be up-converted to a carrier frequency compatible with the normal television channels.

Definitions for CATV systems today call the normal broadcast direction from the head end to the subscribers the "forward path" and the direction from the subscribers back to the head end the "return path." A good review of much of today's existing return path technology is contained in the book entitled *Return Systems for Hybrid Fiber Coax Cable TV Networks* by Donald Raskin and Dean Stoneback, hereby incorporated by reference as background information.

One innovation, which has become pervasive throughout the CATV industry over the past decade, is the introduction of fiber optics technology. Optical links have been used to break up the original tree and branch architecture of most CATV systems and to replace that with an architecture labeled Hybrid Fiber/Coax (HFC). In this approach, optical fibers connect the head end of the system to neighborhood nodes, and then coaxial cable is used to connect the neighborhood nodes to homes, businesses and the like in a small geographical area.

FIG. 1 shows the architecture of a HFC cable television system. Television programming and data from external sources are sent to the customers over the "forward path." Television signals and data are sent from a head end 10 to multiple hubs 12 over optical link 11. At each hub 12, data is sent to multiple nodes 14 over optical links 13. At each node 14, the optical signals are converted to electrical signals and sent to customers over a coaxial cable 15 in the frequency range of 55 to 850 MHz.

Data or television programming from the customer to external destinations, also known as return signals or return data, are sent over the "return path." Form the customer to the node, return signals are sent over the coaxial cable 15 in the frequency range of 5 to 42 MHz. At the node 14, the return signals are converted to optical signals and sent to the hub 12. The hub combines signals from multiple nodes 14 and sends the combined signals to the head end 10.

FIG. 2 is a block diagram of a digital return path 100 of a prior art HFC cable television system that uses conventional return path optical fiber links. As shown, analog return signals, which include signals generated by cable modems and set top boxes, are present on the coaxial cable 102 returning from the customer. The coaxial cable 102 is terminated at a node 24 where the analog return signals are converted to a digital representation by an A/D converter 112. The digital signal is used to modulate a optical data transmitter 114 and the resulting optical signal is sent over an optical fiber 106 to an intermediate hub 12. At the intermediate hub 12, the optical signal is detected by an optical receiver 122, and the detected digital signal is used to drive a D/A converter 124 whose output is the recovered analog return signals. These recovered analog return signals are then combined in an analog fashion with analog return signals from other nodes.

The analog return signals present on the coaxial cable 102 are typically a collection of independent signals. In the United States, because the analog return signals are in the frequency range of 5 to 42 MHz, the sampling rate of the A/D converter is about 100 mHz, slightly more than twice the highest frequency in the band. A 10-bit A/D converter operating at a sampling rate of 100 MHz is typically used for digitizing the return signals. As a result, data will be output from the A/D converter 112 at a rate of about 1 Gbps. Therefore, the optical data transmitter 114 and the optical data receiver 122 must be capable of transmitting and receiving optical signals at a rate of 1 Gbps or higher. The high transmission data rate results in more expensive equipment, or a lower transmission distance, or both. The high transmission data rate also limits the number of analog return signals that can be aggregated for transmission on the same optical fiber.

Accordingly, there exists a need for a method of and system for transmitting data at a lower data rate on the return path of a Hybrid Fiber Coaxial CATV system.

SUMMARY OF THE INVENTION

An embodiment of the present invention is a device for and a method of decreasing the data rate of a digital return path link in a Hybrid Fiber-Coax Cable Television system (HFC-CATV system). In this embodiment, at the node of the CATV system, an analog return signal is digitized, and the bandwidth of the resulting digital data stream is limited to a desired frequency band. The bandwidth-limited data stream is re-sampled at a predetermined multiple of a center frequency of the frequency band. Then, the re-sampled data stream is separated into two data streams of in-phase and quadrature components at the re-sampling frequency. Thereafter, the data streams of in-phase and the quadrature components are digitally decimated to a lower data rate. Subsequently, the decimated data streams are interleaved and serialized for transmission to a head end via optical links.

A reverse process reconstructs the original return signal's bandwidth limited signal components at the head end of the CATV system. More specifically, at the head end of the CATV system, the data stream from the node is de-interleaved to form an in-phase data stream and a quadrature data stream. Then, the in-phase data stream and the quadrature data stream are digitally re-sampled and combined to form another data stream. This resulting data stream is bandpass filtered and re-sampled at a higher rate to form an output data stream, which is converted subsequently into analog form to recover an analog return signal.

In one embodiment, the decimated data stream has a data rate that is twice the bandwidth of the desired frequency band. If the bandwidth of the desired frequency band is low, low speed optical data transmitters and low speed optical data receivers can be used to transport the signals. Because low speed optical links are inexpensive, the overall cost of the CATV system is reduced.

BRIEF DESCRIPTION OF THE DRAWINGS

Other advantages and aspects of the present invention will be more readily apparent from the following description and appended claims when taken in conjunction with the accompanying drawings, in which:

DESCRIPTION OF THE PREFERRED EMBODIMENTS

Figure 1:
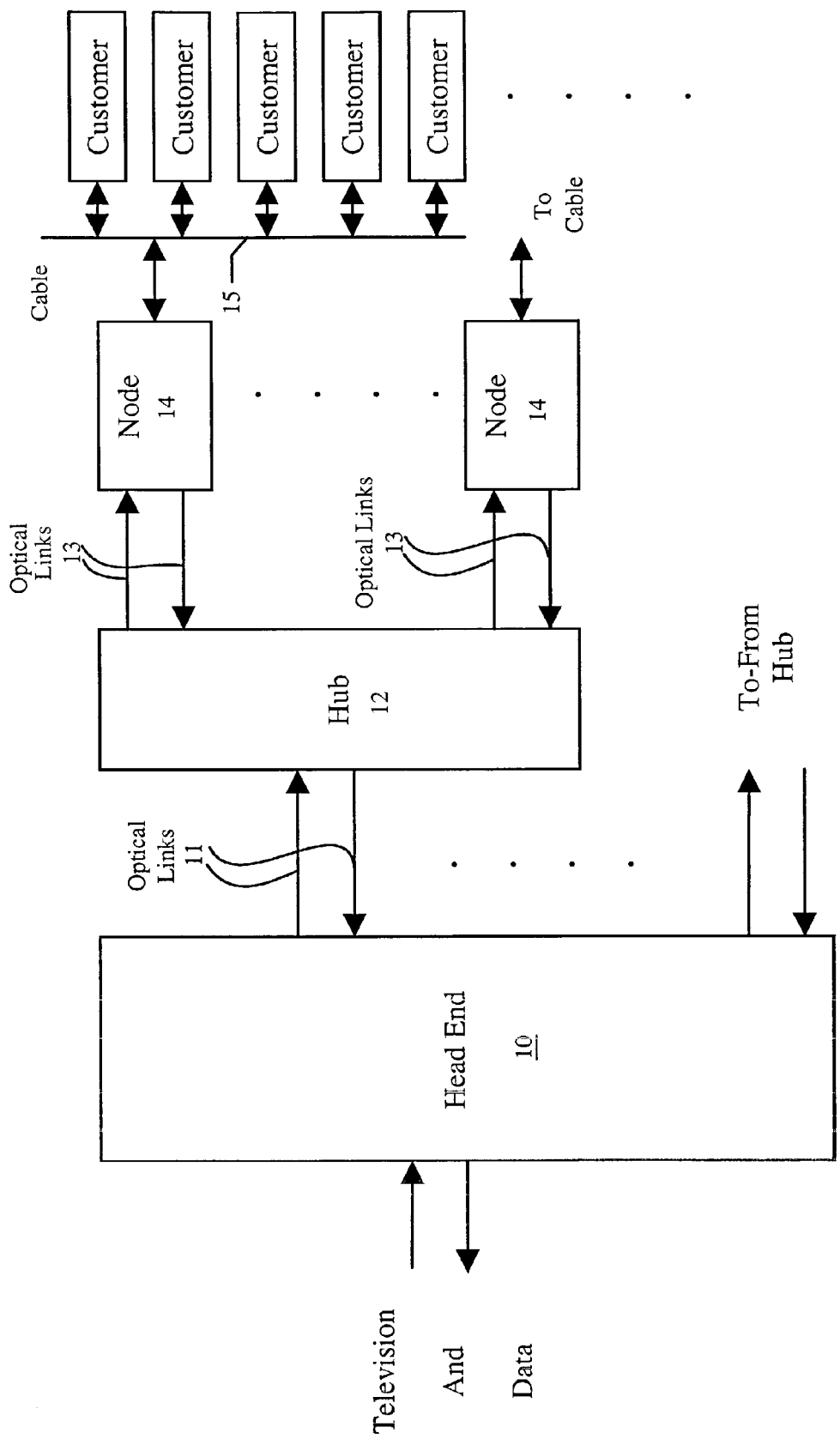
FIG. 1 shows the architecture of a cable television system.
Figure 2:
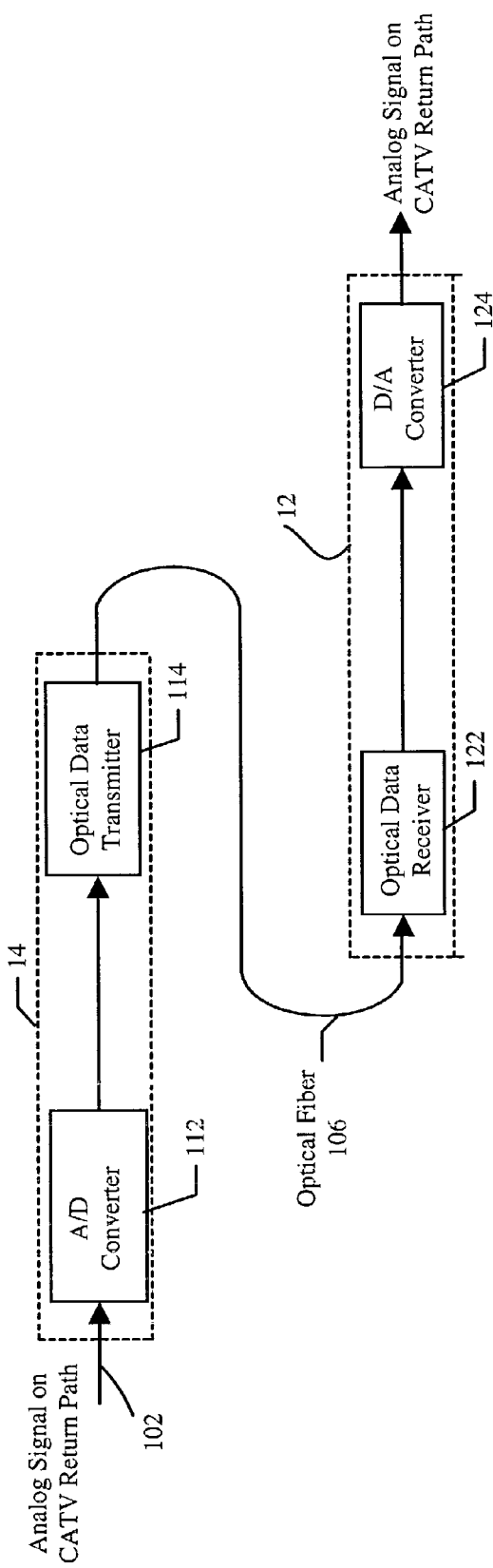
FIG. 2 is a block diagram of a cable television (CATV) digital return path of the prior art.
Figure 3:
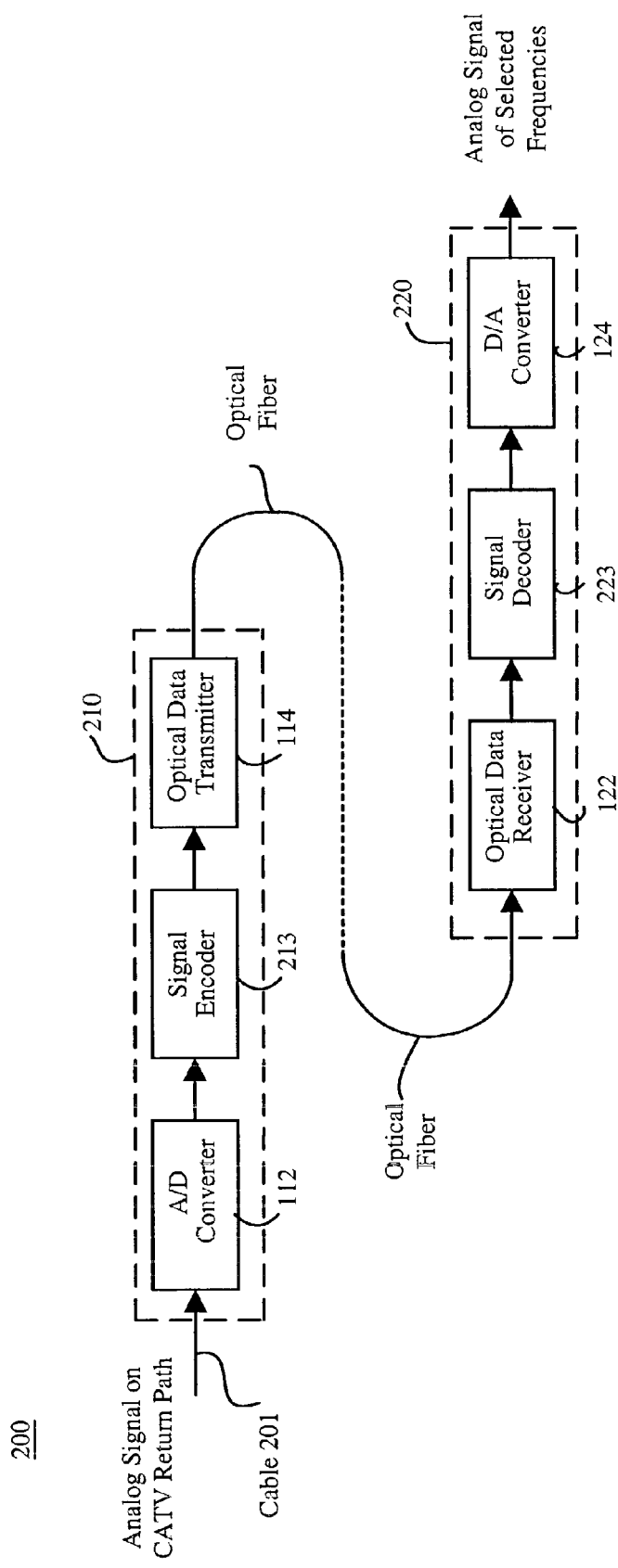
FIG. 3 is a block diagram of a CATV return path according to one embodiment of the present invention.

FIG. 3 is a block diagram depicting a CATV return path 200 according to one embodiment of the present invention. At the CATV return path transmitter 210, an A/D converter 112 receives an analog return signal from a co-axial cable 201 and generates a stream of data at a full sampling rate (e.g., 100 MHz). A signal encoder 213 encodes the output of the A/D converter 112 and generates another stream of data at a lower data rate. The low data rate output of the signal encoder 213 is provided to the optical data transmitter 114 for transmission to a hub 220 as optical signals. According to the present invention, the hub 220 can be an intermediate hub or a head end hub.

At the hub 220, an optical data receiver 122 receives the optical signals from the transmitter 210 and converts the signals to a low data rate data stream corresponding to the one generated by the signal encoder 213. A signal decoder 223 receives and decodes the output of the optical data receiver 122 and generates a stream of data at a full sampling rate. The output of the decoder 223 is provided to the D/A converter 124 for conversion into analog signals. In this embodiment, the signal encoder 213 and signal decoder 223 enable digital data to be transmitted across the optical link at a lower rate than N*F bits per second (where N is the number of bits and F is the sampling frequency of the A/D converter 112). However, the entire spectrum of the analog return signal originally present on cable 201 is not recreated at the output of the hub 220. Only frequencies within a desired frequency band of the analog return signal are recovered at the hub 220.

Figure 4:
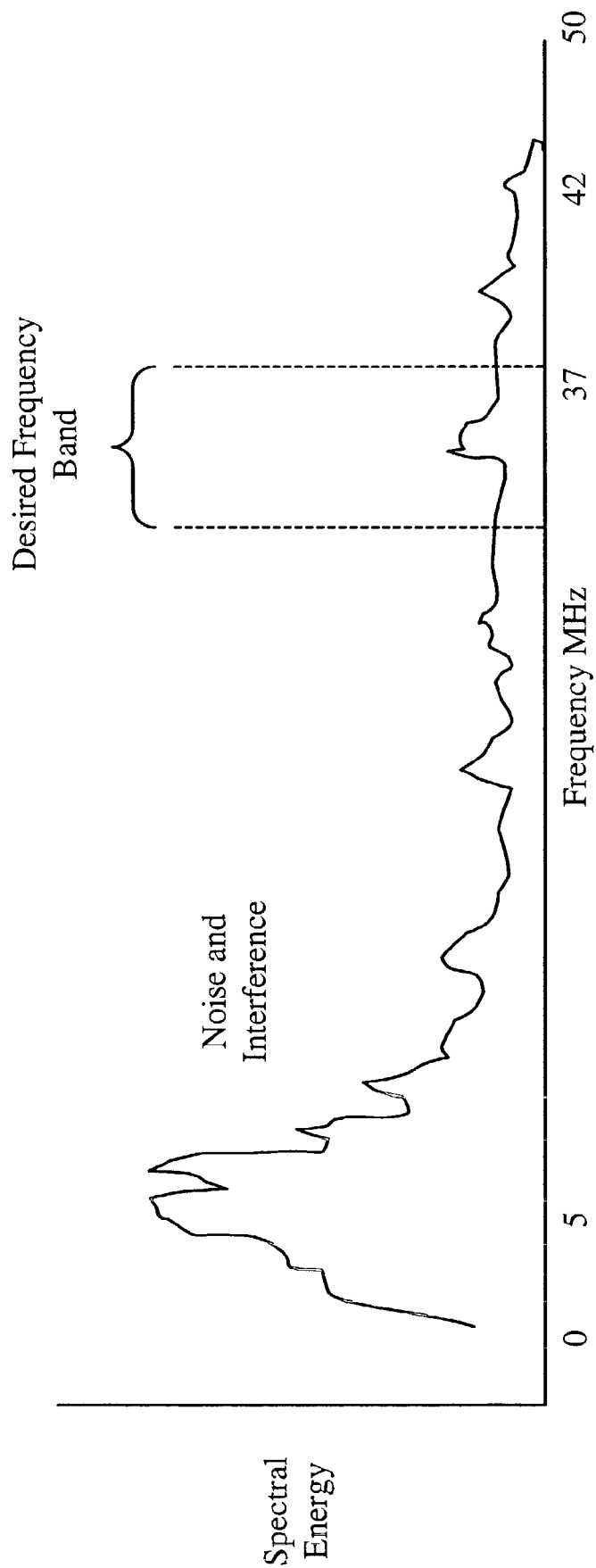
FIG. 4 illustrates a relationship between spectral energy and frequency of signals carried by a conventional CATV digital return path and a desired frequency band that is carried by a CATV digital return path of FIG. 3.

The analog return signal carried by the co-axial cable 201 is an analog signal with signal components in a predefined frequency range, such as 5 to 42 MHz. FIG. 4 illustrates the spectral density of the signal components of a typical analog return signal. In prior art CATV systems, most or all of the signal components from 5 to 42 MHz are communicated via the return path to the head end. A typical sampling rate of the analog return signal is 100 MHz, which is higher than twice the highest frequency transmitted in the return path. In some CATV systems, users of the CATV return path only use specific portions of the return path spectrum. Thus, in those systems, only those portions of the return path spectrum carrying useful information need be transmitted from the node 210 to the hub 220. Other portions of the return path spectrum can be filtered out. In one particular embodiment as shown in FIG. 4, the desired signal is only in a portion of the return path spectrum approximately between 34 MHz and 40 MHz with a total bandwidth of approximately 6 MHz. When only a specific portion of the return path spectrum is transmitted, (e.g., the spectrum between 34 MHz and 40 MHz) the data rate of the optical link can be significantly reduced.

Figure 5:
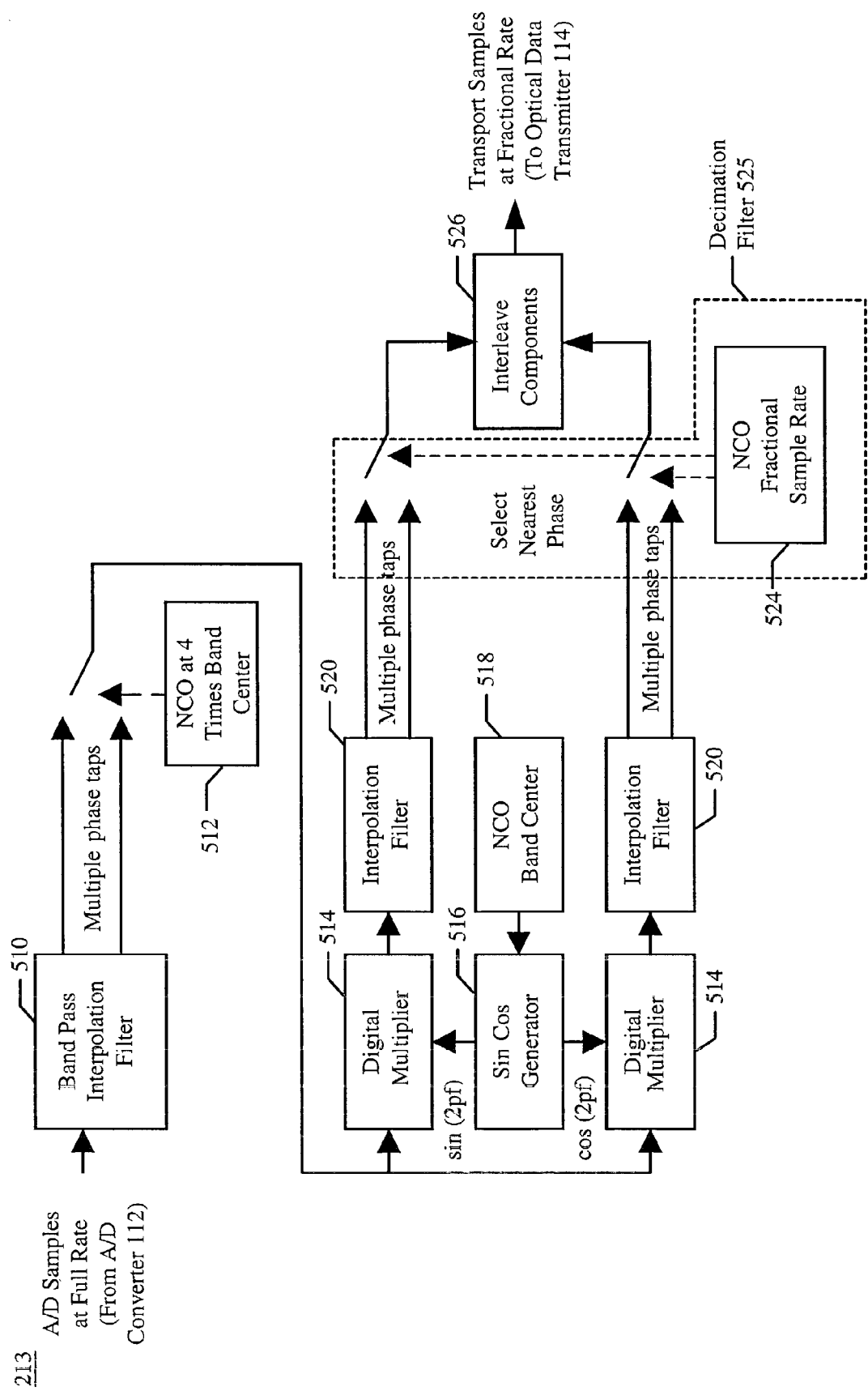
FIG. 5 illustrates an encoder that can be used in the CATV digital return path of FIG. 3.

According to one embodiment of the present invention, the logic for transmitting a signal that embodies a specific portion of the return path spectrum is implemented in the encoder 213. One implementation of the encoder 213 is shown in FIG. 5. As shown, a stream of A/D samples at the Full Rate of 100 MHz is first filtered in a digital FIR (Finite Impulse Response) band-pass interpolation filter 510 to form a band-limited data stream. The filter rate of the band-pass interpolation filter 510 is chosen as a ratio of integers times the sample rate. As used herein, Center Frequency of a bandpass filter refers to the frequency approximately at the center of the frequency band to be retained. For example, if the frequency band to be retained is the band between 32-38 MHz, the Center Frequency of the bandpass filter will be approximately 35 MHz. The Center Frequency of the bandpass interpolation filter 510, in one embodiment, is chosen to be 6/17 of the Full Rate (100 MHz), which is approximately 35.29 MHz. In the present embodiment, A/D samples enter the filter at the Full Rate (e.g., 100 MHz), and samples are read from the multiple phase taps of band-pass interpolation filter 510 at a rate that is a multiple (e.g., four times) of the Center Frequency of the bandpass filter 510 to form another stream of samples. In the present discussion, it is assumed that samples are read from the bass-pass interpolation filter 510 at a rate that is four times the Center Frequency. That is, in the present discussion, if the Center Frequency is 35.29 MHz, then samples are read from the band-pass interpolation filter 510 at a rate of 141.176 MHz. In the present embodiment, the data rate at which samples are read from the outputs of the bandpass interpolation filter 510 is set by an NCO (Numerically Controlled Oscillator) 512. In other embodiments, the rate at which samples are read from the outputs of the bandpass interpolation filter 510 can be unequal to four times of the Center Frequency.

Figure 7:
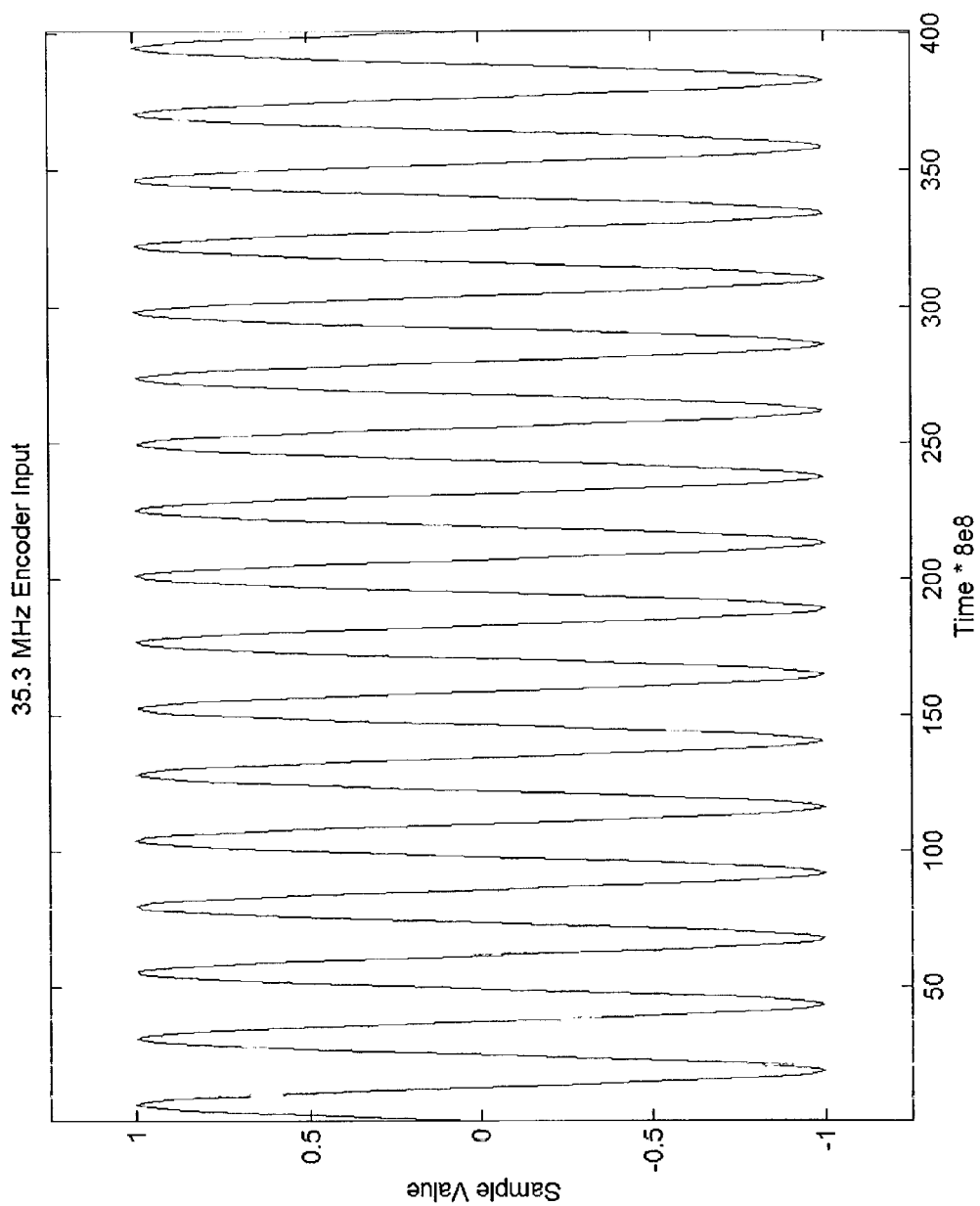
FIG. 7 depicts an example analog input waveform at 33 MHz.
Figure 8:
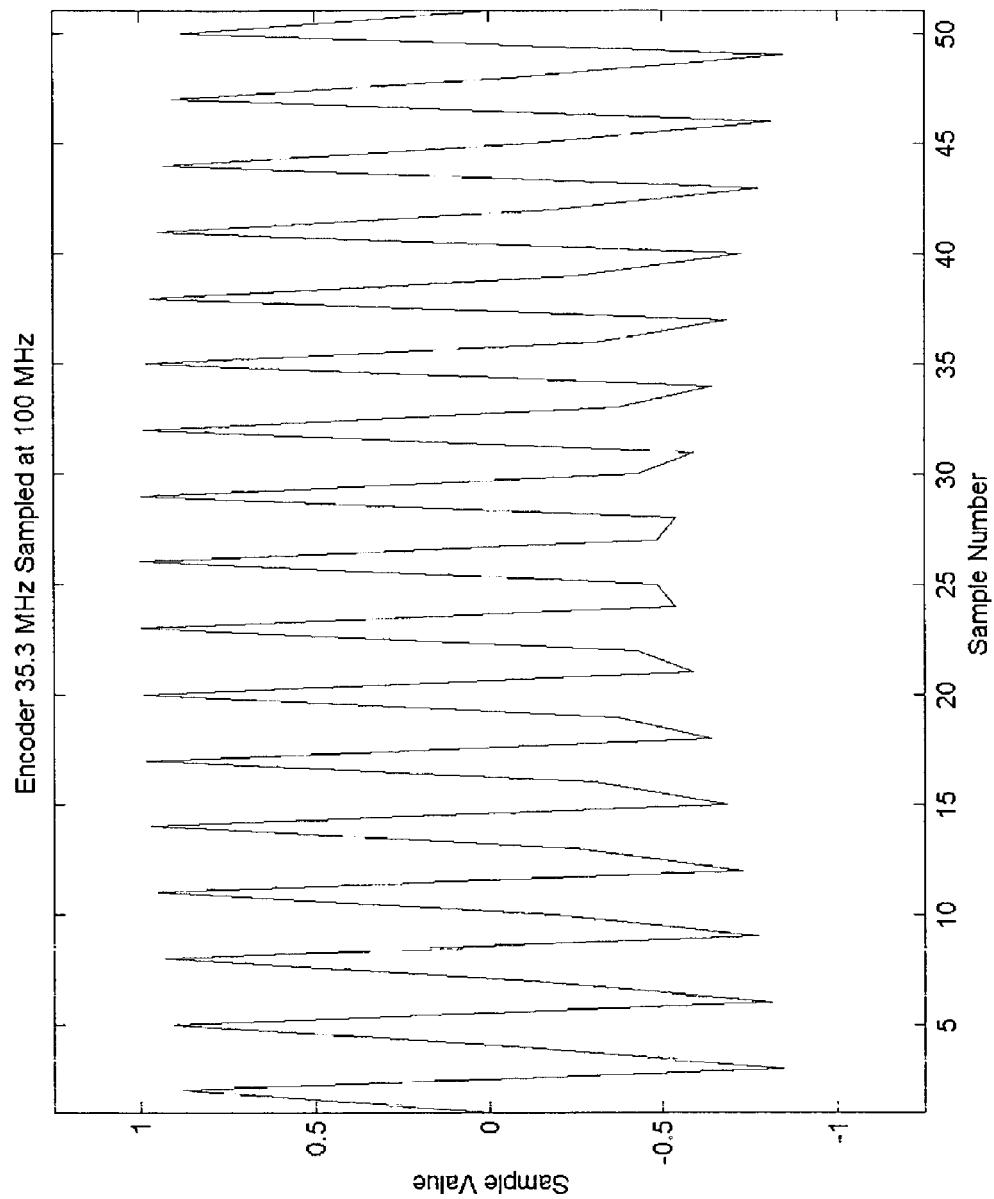
FIG. 8 depicts samples of the example waveform of FIG. 7 at a sampling rate of 100 MHz.
Figure 9:
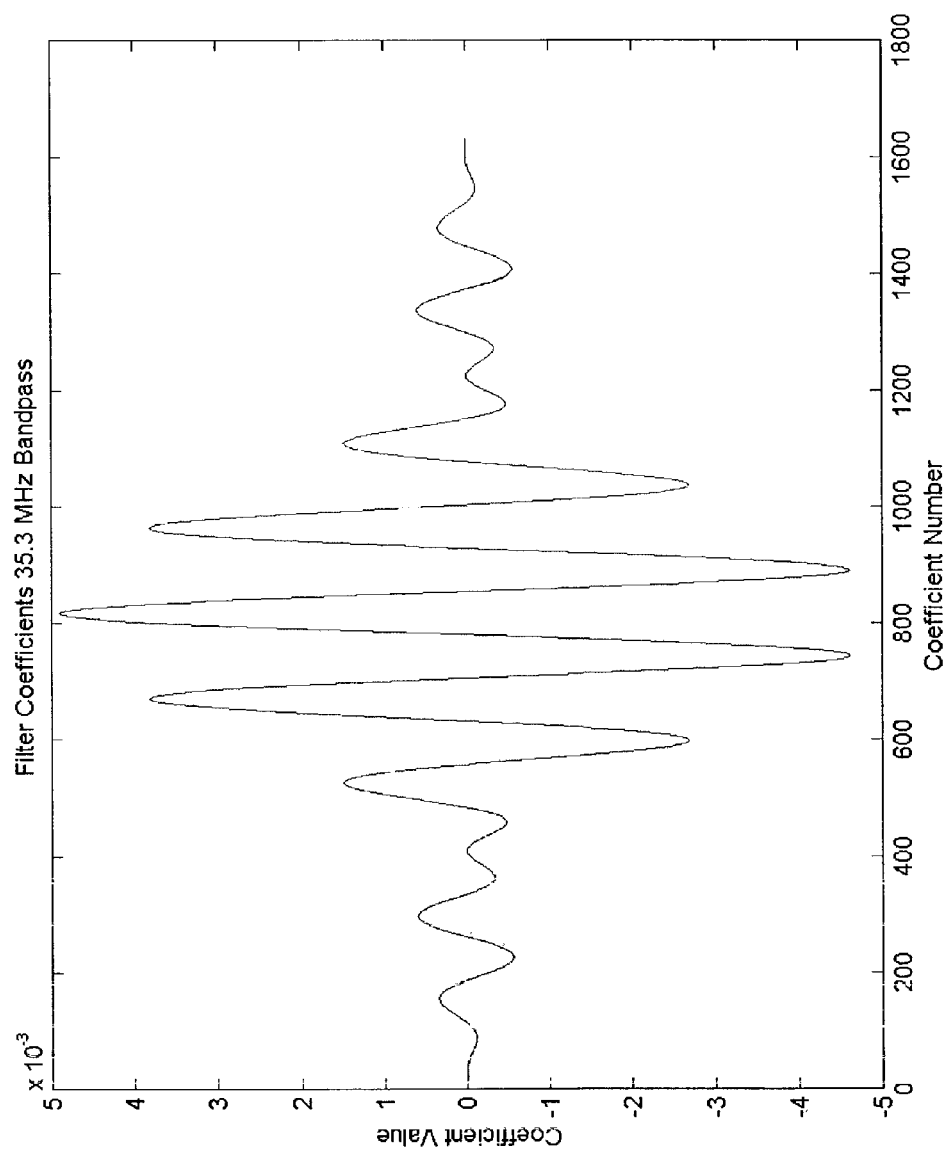
FIG. 9 depicts the filter coefficients of a 35.3 MHz bandpass filter.
Figure 10:
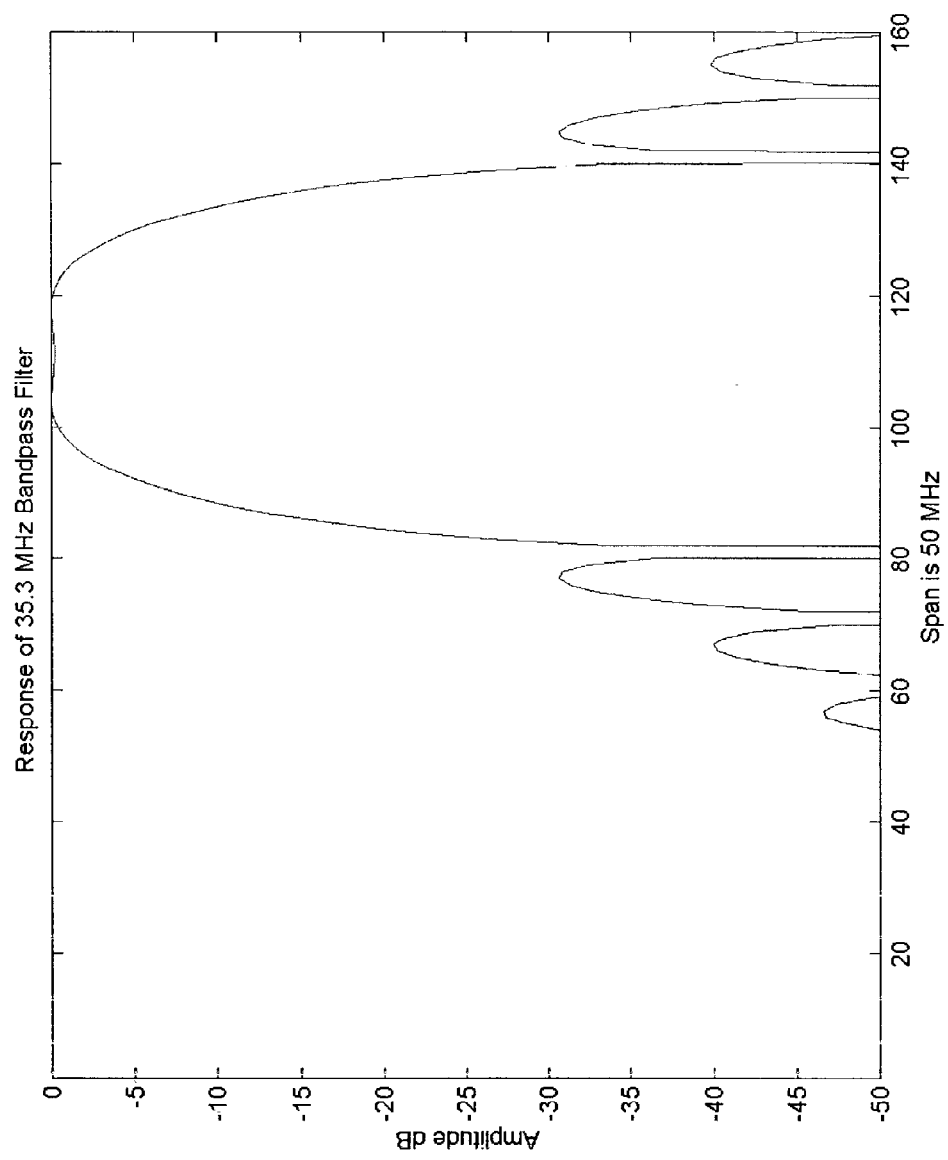
FIG. 10 depicts the filter response of the 35.3 MHz bandpass filter having the filter coefficients of FIG. 9.
Figure 11:
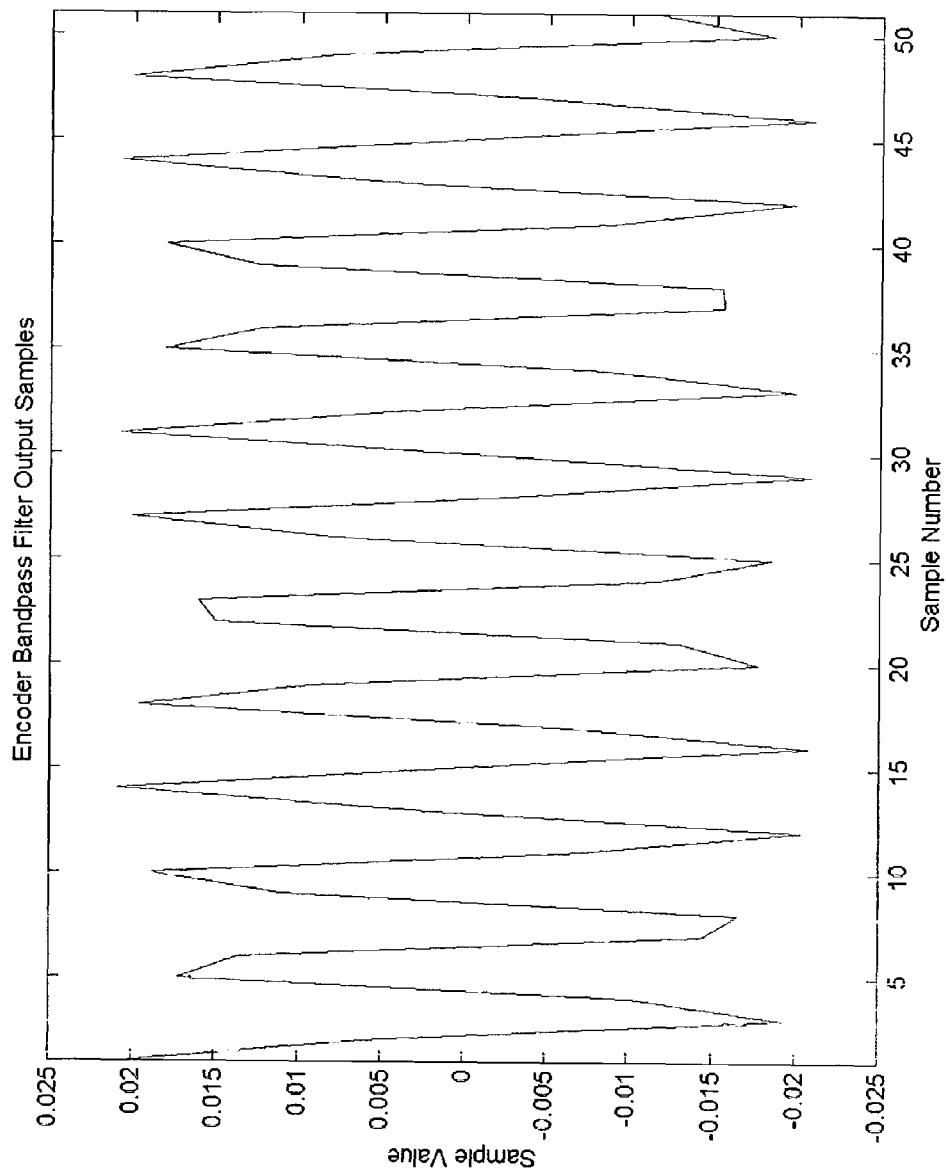
FIG. 11 depicts samples of the example waveform of FIG. 7 at a sampling rate of 141.176 MHz.

As an example, an analog input waveform of 33 MHz is shown in FIG. 7. When the 33 MHz analog waveform is sampled at 100 MHz, the resulting samples are shown in FIG. 8. In this example, the coefficients of the FIR filter 510 with its Center Frequency at 35.3 MHz are shown in FIG. 9, and the filter response of the FIR filter 510 is shown in FIG. 10. When the 33 MHz waveform is sampled by interpolation by the FIR filter 510 at 141.176 MHz, the samples that make up a band-limited data stream are obtained. FIG. 11 depicts the band-limited data stream.

Figure 12:
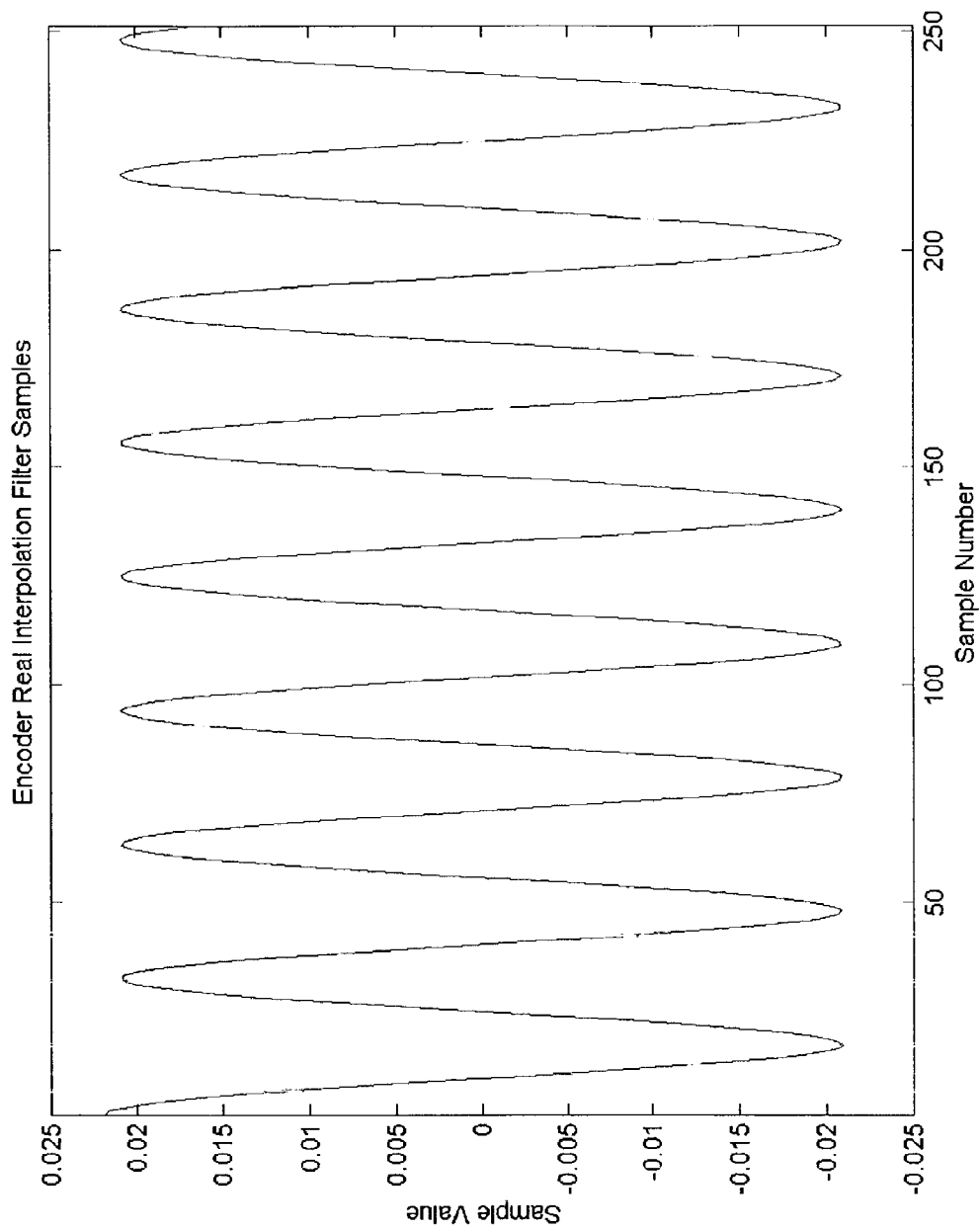
FIG. 12 depicts an in-phase component of the waveform of FIG. 11.
Figure 13:
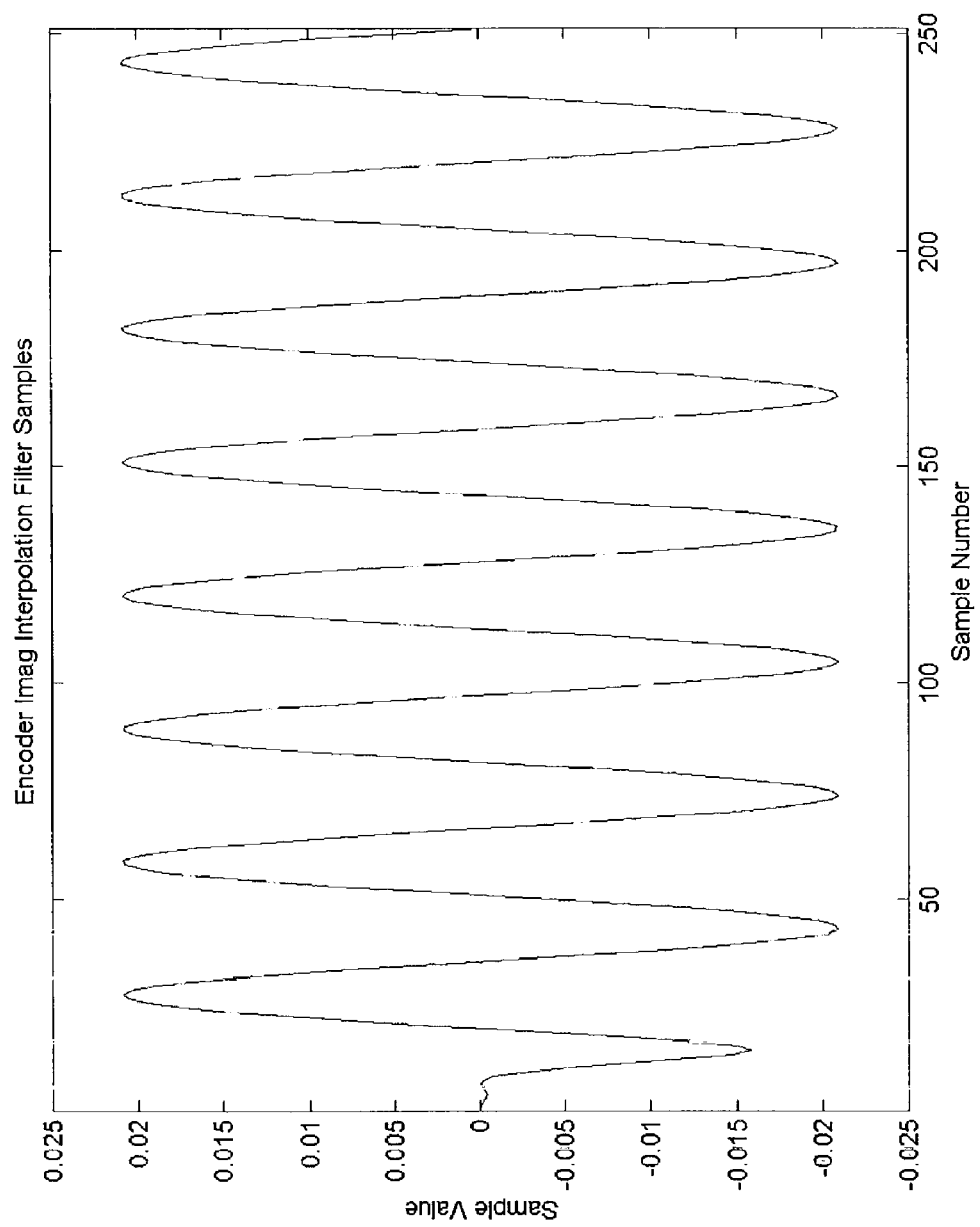
FIG. 13 depicts a quadrature component of the waveform of FIG. 11.

With reference again to FIG. 5, the band-limited data stream is provided to digital multipliers 514 where it is separated into two data streams, one of which carries in-phase components and the other of which carries quadrature components. The data stream carrying the in-phase components is referred to as the in-phase data stream. Likewise, the data stream carrying the quadrature components is referred to as the quadrature data stream. In the present embodiment, the separation is achieved by multiplying the band limited data stream by the cosine and sine waveforms whose frequency is the Center Frequency of the frequency band to be retained. The cosine and sine waveforms, in the present embodiment, are generated by a sin/cos generator 516 at a data rate of the band-limited data stream. In other words, the cosine and sine waveforms are generated at a rate of four times the Center Frequency. Thus, in the present embodiment, the cosine waveform will include a stream of +1 0 −1 0 +1 0 −1 0 . . . , and the sine waveform will include a stream of 0 +1 0 −1 0 +1 0 −1 . . . . Digital multiplication of the band-limited data stream by the cosine waveform results in a stream of in-phase components, and digital multiplication of the band-limited data stream by the sine waveform results in a stream of "quadrature" components. As an example, the in-phase and quadrature waveforms are illustrated in FIGS. 12 and 13. Note that zeros are not output by the digital multipliers 514. Thus, the data rate of the in-phase data stream 740 and that of the quadrature data stream 750 are approximately half of the data rate of the band-limited data stream 710.

In the present embodiment, the Center Frequency used by sin/cos generator 516 is generated by a numerically controlled oscillator (NCO) 518. In other embodiments, the cosine and sine waveforms are generated by a look up table in memory or by other computational means.

With reference again to FIG. 5, digital interpolation filters 520 up-sample the in-phase and quadrature data streams such that their outputs can be decimated accurately by a decimation filter 525 to a desired output rate. In one embodiment, the output rate is generated by an NCO 524, and decimation is accomplished by only sampling the output of the interpolation filters 520 at the desired output data rate. In one embodiment, the desired output rate is at least twice the bandwidth of the desired frequency band. For example, if the bandwidth of the desired frequency band is 6 MHz, then the desired output rate is at least 12 MHz.

Figure 14:
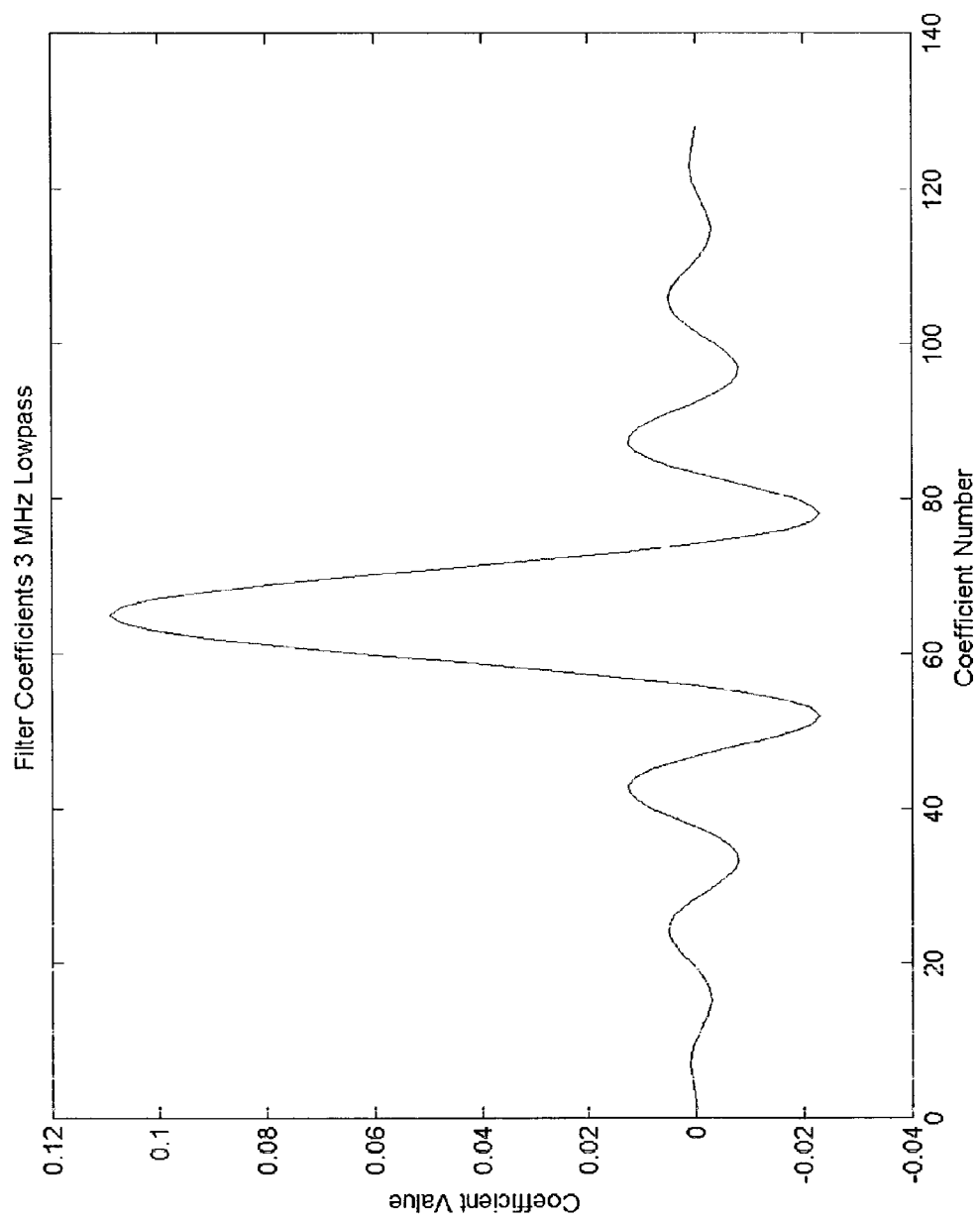
FIG. 14 illustrates the filter coefficients of an example 3 MHz lowpass interpolation filter.
Figure 15:
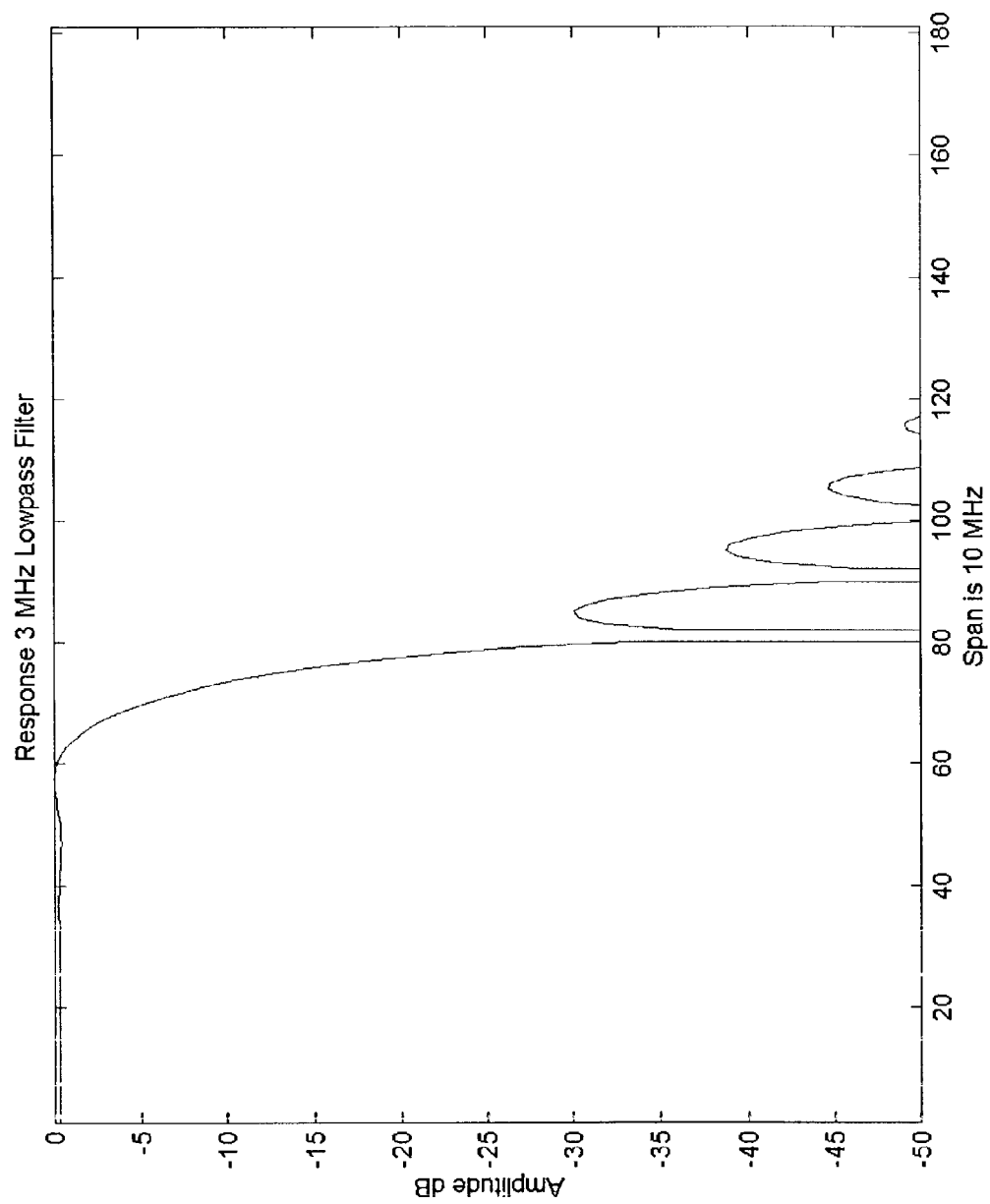
FIG. 15 depicts the frequency response of a 3 MHz low pass interpolation filter having the filter coefficients of FIG. 14.
Figure 16:
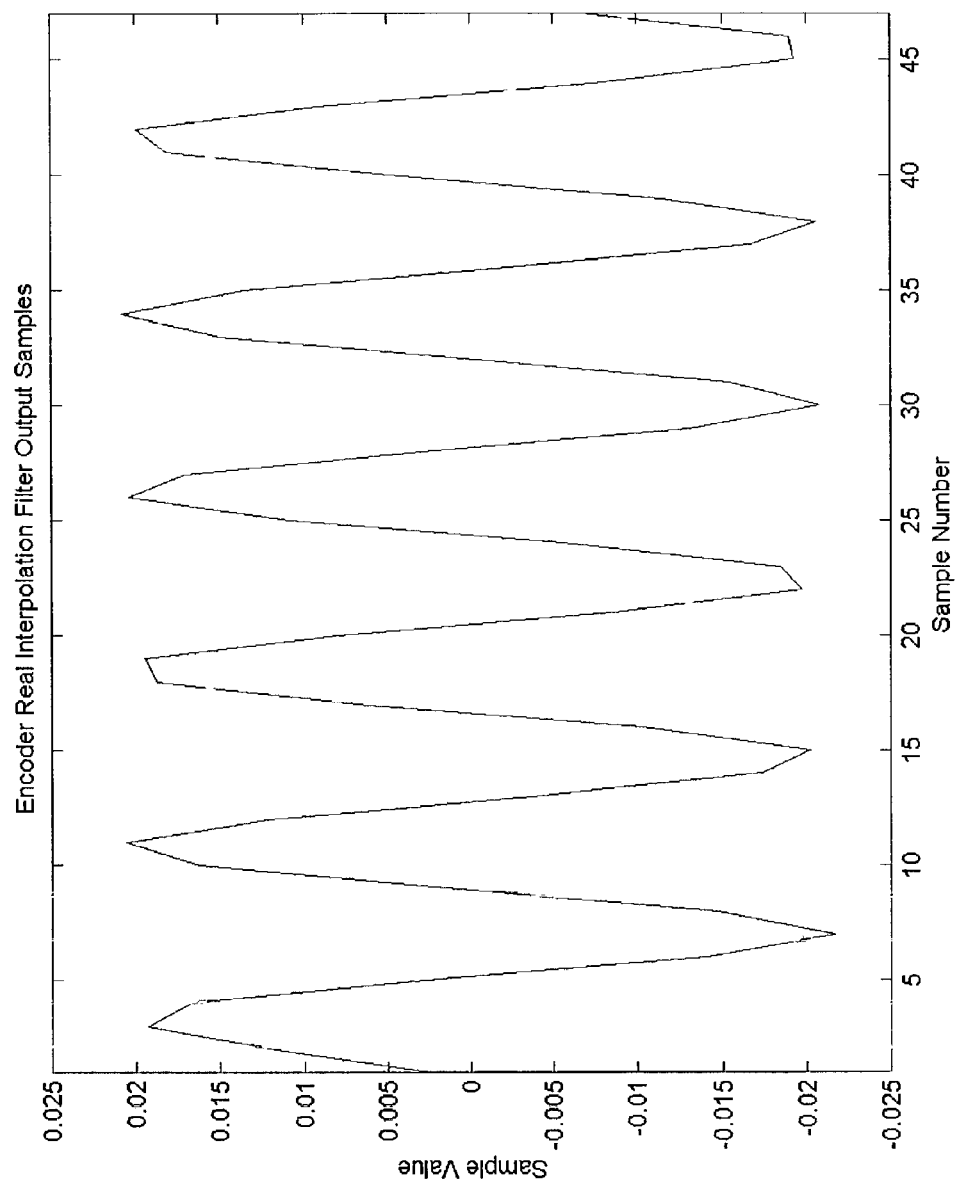
FIG. 16 depicts a decimated in-phase data stream according to an embodiment of the invention.
Figure 17:
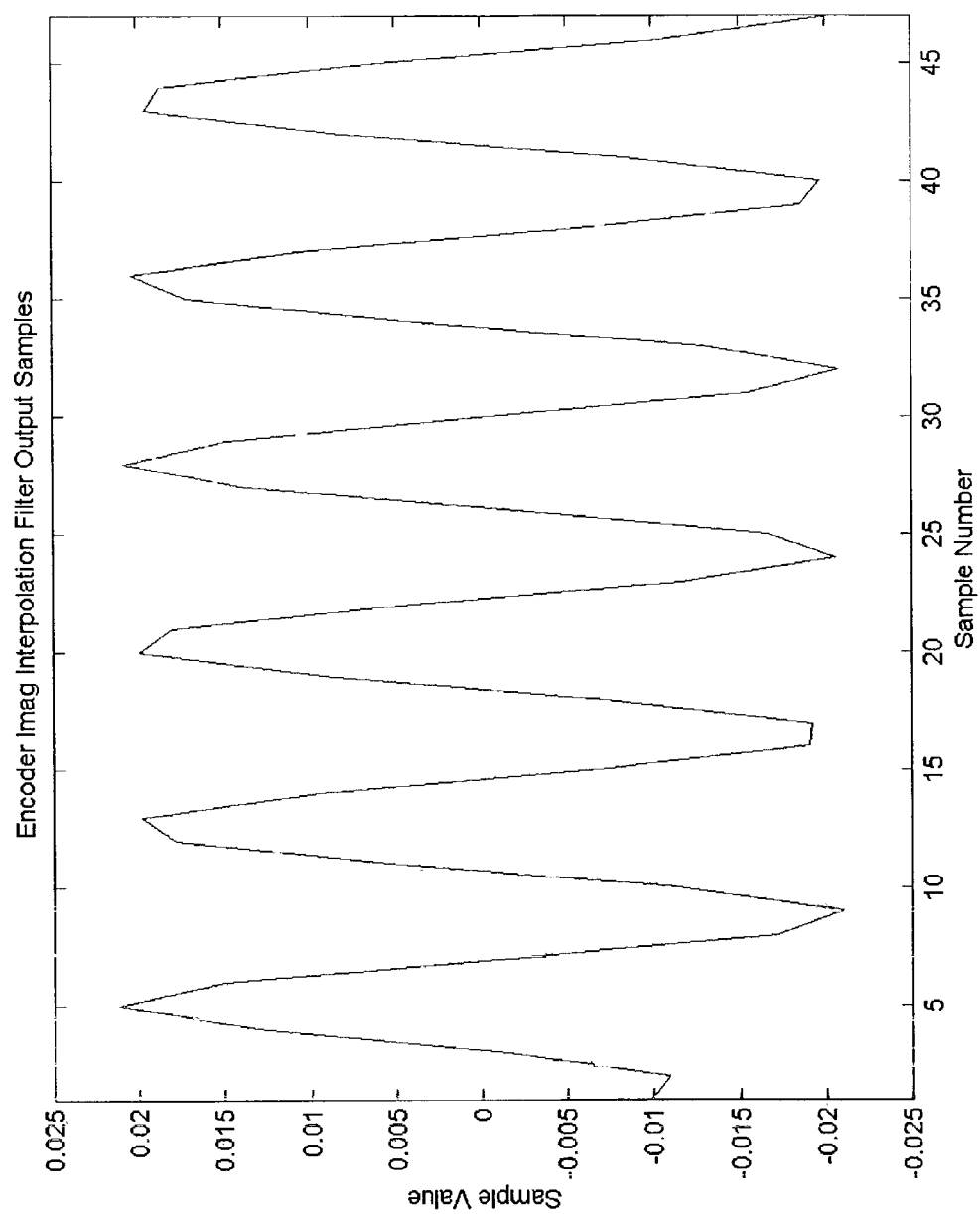
FIG. 17 depicts a decimated quadrature data stream according to an embodiment of the invention.

The FIR filter coefficients for an example implementation of one of the digital interpolation filters 520 are shown in FIG. 14. In this example, the digital interpolation filter 520 in 3 MHz lowpass interpolation filter. The frequency response of a 3 MHz lowpass interpolation filter is shown in FIG. 15. Further, in this example, the outputs of the digital interpolation filters 520 are decimated to a sample rate of 17.647 MHz. The decimated in-phase and quadrature data streams are illustrated in FIGS. 16 and 17.

With reference still to FIG. 5, the decimated data streams generated by the decimation filter 525 are then interleaved. The stream of interleaved samples is referred herein as the transport stream. The data rate of the transport stream, therefore, is the sum of the data rates of the decimated in-phase and quadrature streams determined by decimation filter 525. Then, the transport stream is serialized by a SERDES circuit (not shown) and the resulting serial bit stream is used to drive the optical data transmitter 114 for generating optical signals for transmission to the hub 220.

Figure 6:
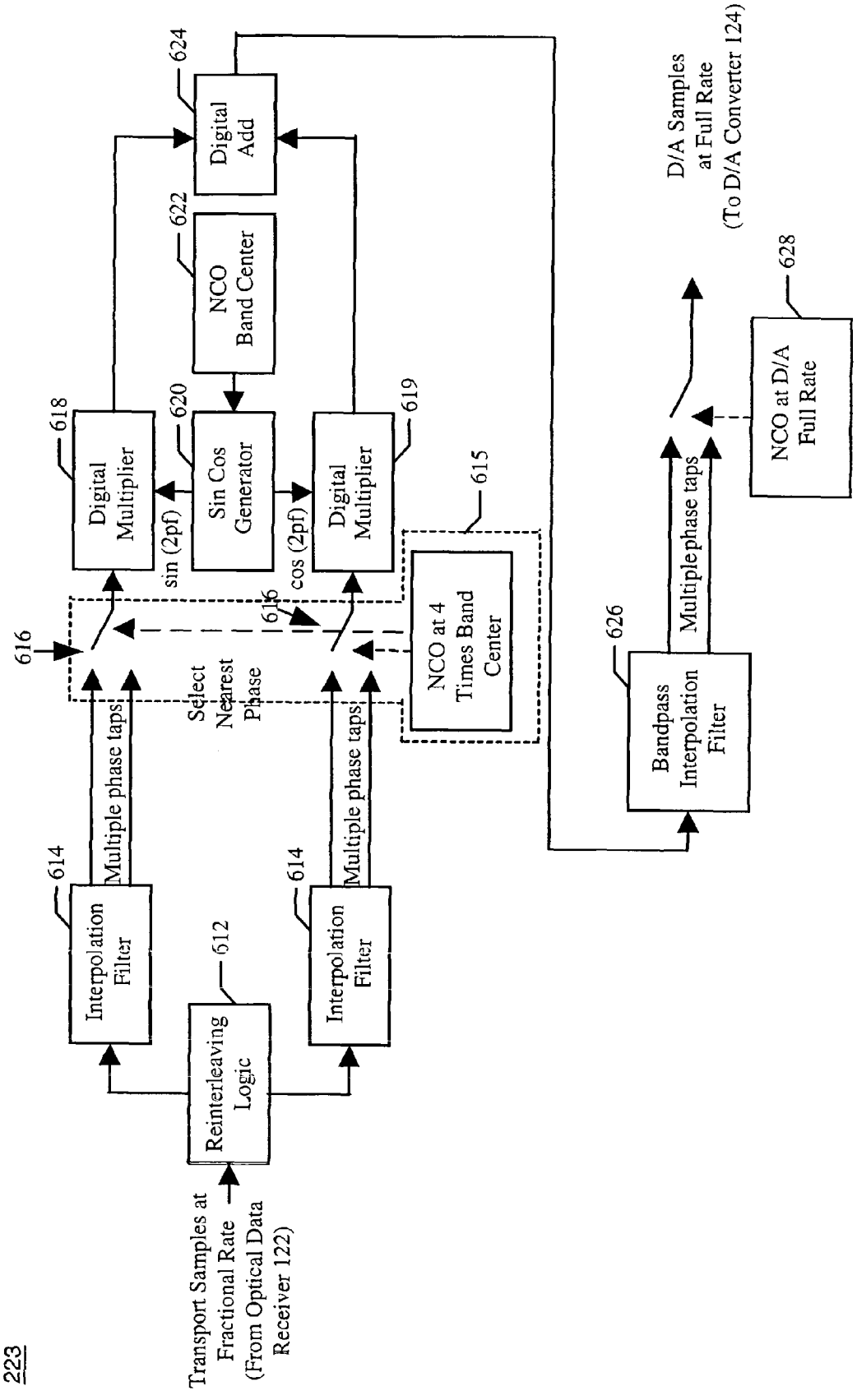
FIG. 6 illustrates a decoder that can be used in the CATV digital return path of FIG. 3.
Figure 18:
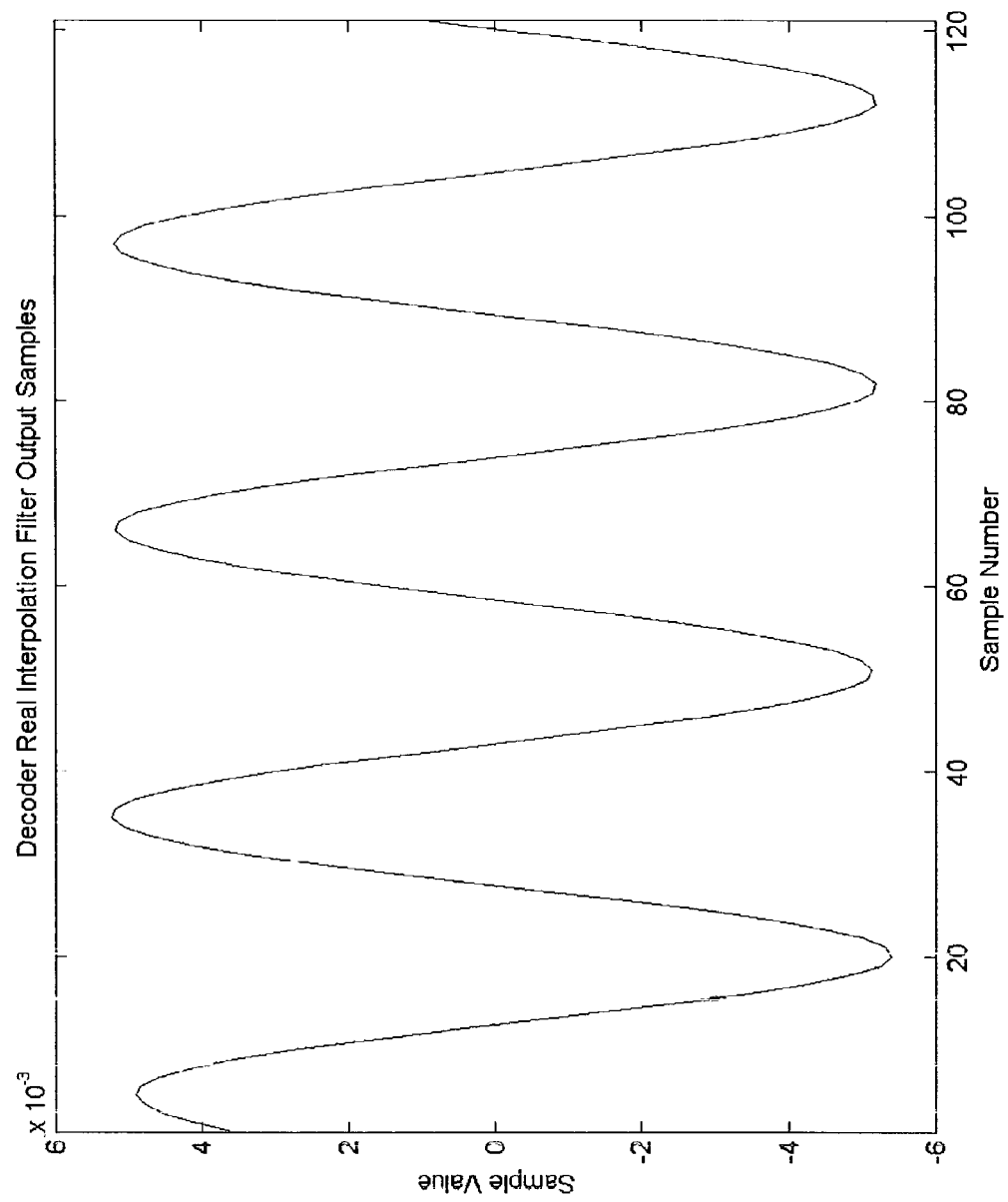
FIG. 18 depicts a data stream generated by up-sampling the in-phase data stream of FIG. 16.
Figure 19:
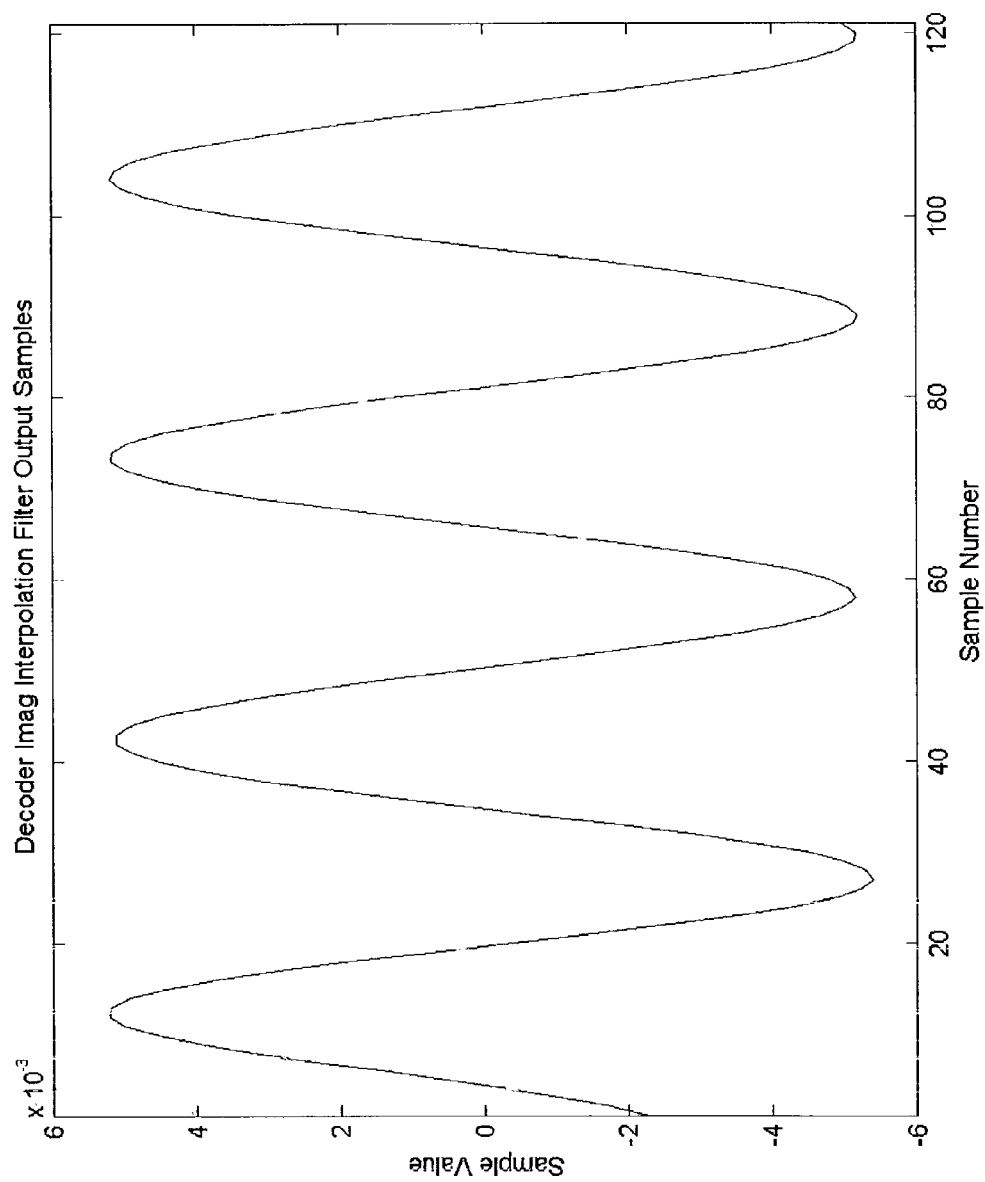
FIG. 19 depicts a data stream generated by up-sampling the quadrature data stream of FIG. 17.

Attention now turns to FIG. 6, which is a block diagram depicting an implementation of signal decoder 223 in accordance with an embodiment of the present invention. The signal decoder 223 is coupled to SERDES circuits of the optical data receiver 122 to receive the transport stream generated by node 210. As described above, the transport stream consists of interleaved in-phase and quadrature components of the transmitted signal. At the signal decoder 223, the transport samples are first deinterleaved by deinterleaving logic 612 to form two separate streams one of which is the decimated in-phase stream and the other is the decimated quadrature stream. Then, the in-phase stream and the quadrature stream are filtered by interpolation filters 614. In one embodiment, the interpolation filters 614 are implemented in a similar fashion as interpolation filters 520 of the signal encoder 213. FIGS. 18 and 19 are the upsampled in-phase and quadrature data streams of the example 33 MHz waveform, which are nearly the same as the waveforms of FIGS. 12 and 13, differing only by computational errors. Here, the interpolation filters 614 up-sample the in-phase stream and the quadrature stream such that they have a data rate at four times the Center Frequency of the desired frequency band. In other embodiments, the interpolation filters 614 up-sample the in-phase stream and the quadrature stream to sample rates that are not equal to four times the Center Frequency.

With reference still to FIG. 6, the signal decoder 223 includes digital multipliers 618, 619 and sin/cos generator 620 for generating sine and cosine waveforms. As shown, the sin/cos generator 620 receives the Center Frequency from the NCO 622 and generates cosine and sine waveforms at the Center Frequency. Note that the cosine and sine waveforms, in the present embodiment, are generated at a data rate four times the Center Frequency. Thus, in the present embodiment, the cosine waveform will include a stream of +1 0 −1 0 +1 0 −1 0 . . . , and the sine waveform will include a stream of 0 +1 0 −1 0 +1 0 −1 . . . . The in-phase stream is multiplied by the cosine waveform and the quadrature stream is multiplied by the sine waveform. Digital multiplication of the stream in phase by the cosine waveform results in a stream of values with alternating zeros, and digital multiplication of the quadrature stream by the sine waveform results in another stream of values with alternating zeros.

Figure 20:
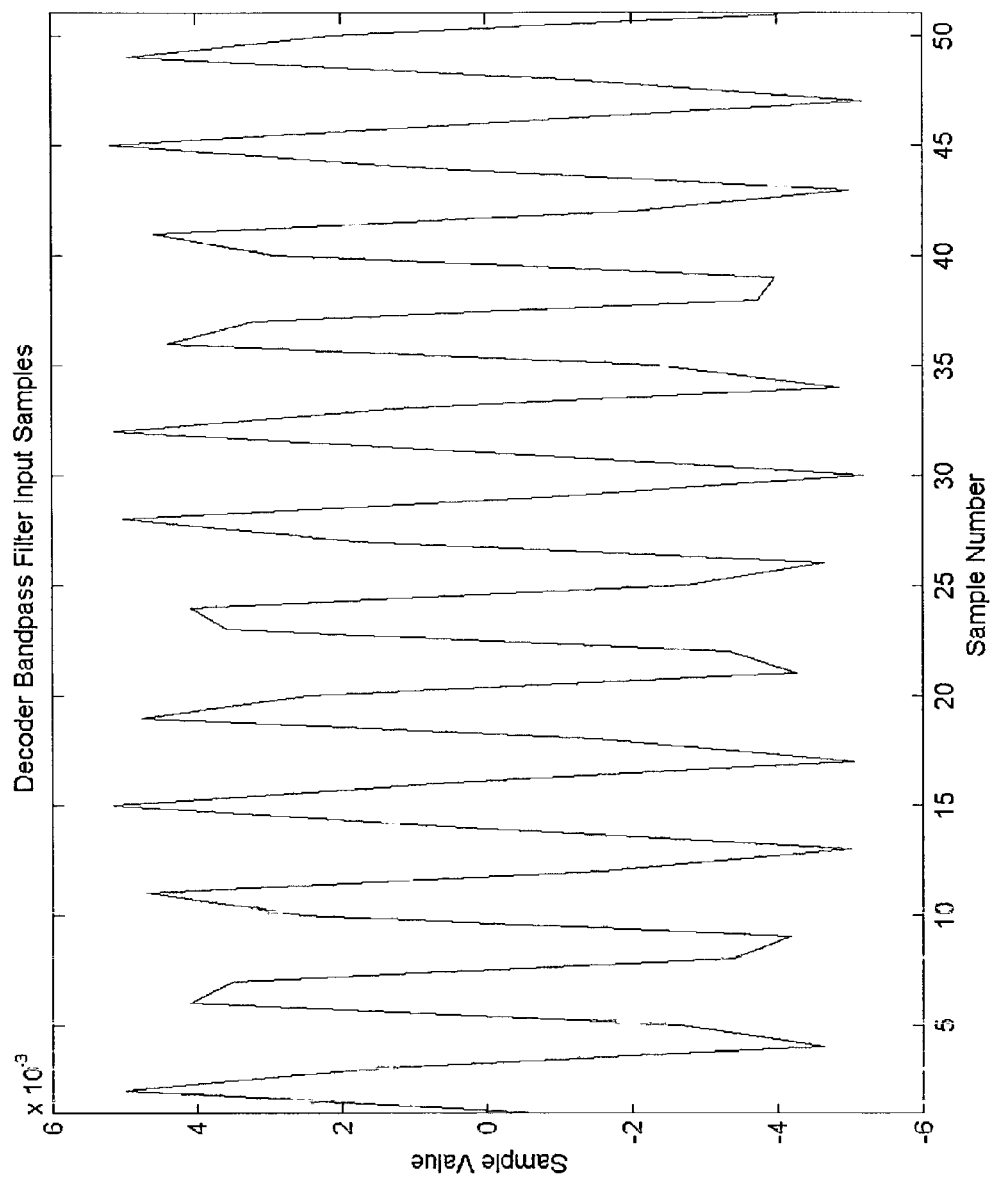
FIG. 20 depicts a data stream generated by combining the up-sampled data streams of FIGS. 18 and 19.
Figure 21:
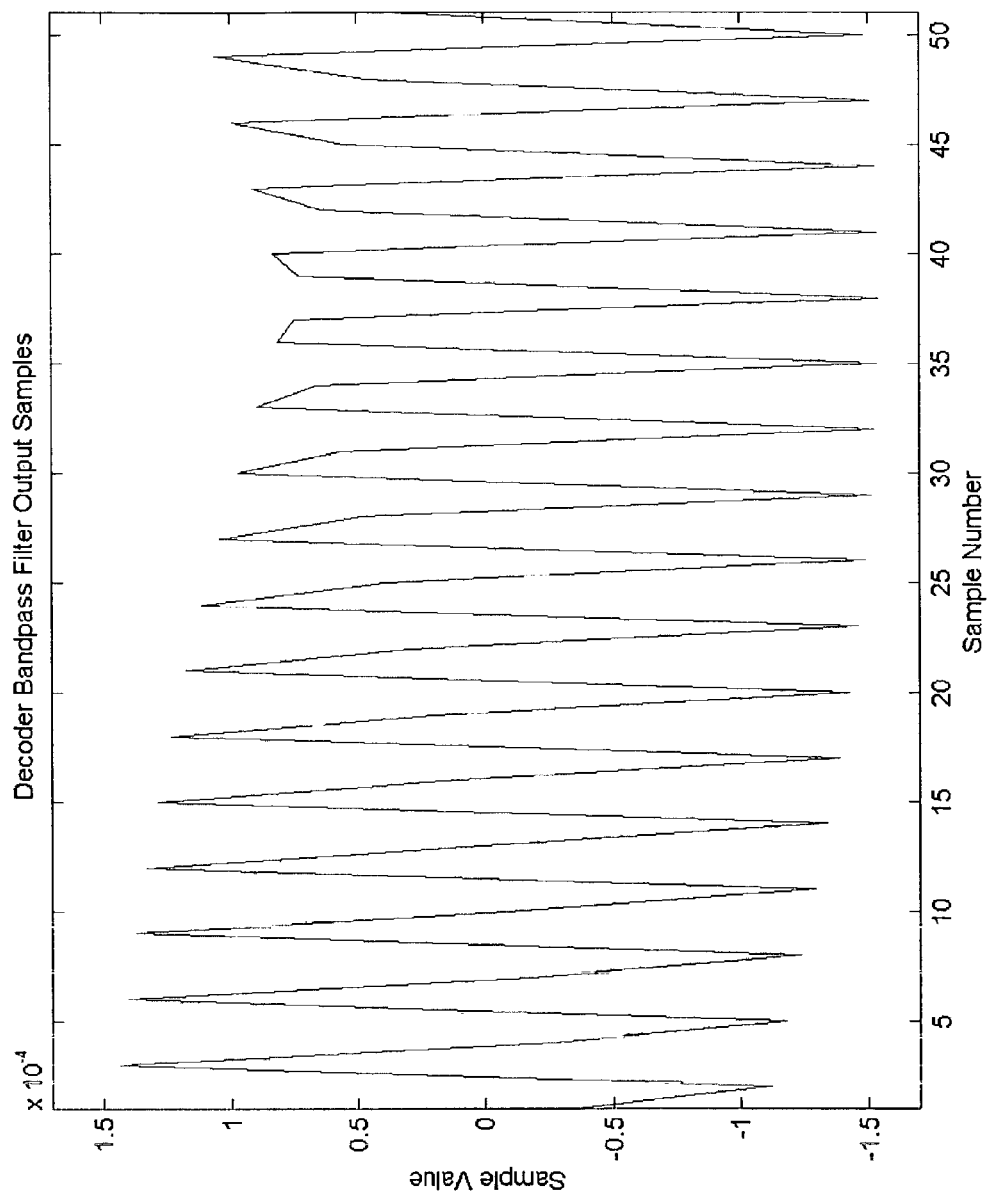
FIG. 21 depicts a data stream generated by resampling the combined data stream of FIG. 20 at 100 mega-samples per second.
Figure 22:
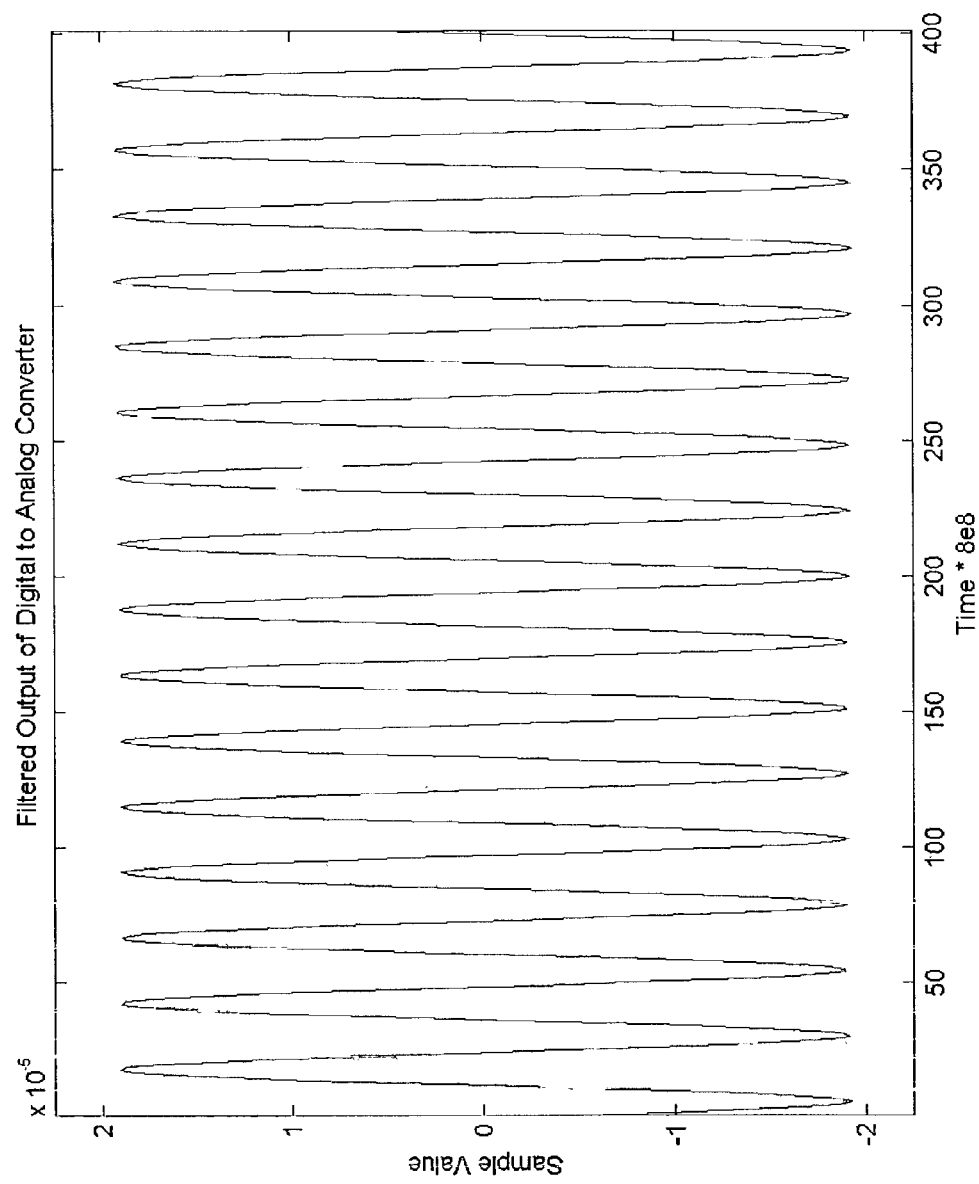
FIG. 22 depicts an analog waveform generated using the data stream of FIG. 21 and an analog lowpass filter.

The outputs of the digital multipliers 618, 619 are added in by digital adder 624 to generate yet another data stream whose data rate is four times the Center Frequency. The upsampled and combined samples of the example 33 MHz waveform are shown in FIG. 20. The output of the digital adder 624 is processed by a bandpass interpolation filter 626, which is constructed similarly to the bandpass interpolation filter 510. The output of the bandpass interpolation filter 626 is decimated to an output data rate. In the present embodiment, the output data rate, which is defined by NCO 628, is the Full Rate (e.g., 100 MHz). The 100 mega-sample per second resampled output of the bandpass filter is shown in FIG. 21 for the example 33 MHz waveform. The digital samples output by the signal decoder 223 are sent to the D/A converter 124 to be converted to an analog signal. The analog signal thus recovered will have signal components within the desired frequency band. For the example 33 MHz waveform, the output of the D/A converter with an analog low pass filter is the recovered analog wave form of FIG. 22.

While the present invention has been described with reference to a few specific embodiments, the description is illustrative of the invention and is not to be construed as limiting the invention. Various modifications may occur to those skilled in the art without departing from the true spirit and scope of the invention. For instance, in another embodiment, the desired frequency band transmitted encompasses the full bandwidth of the input signal. That is, for a frequency band to be transmitted is 5 MHz to 42 MHz, and the Center Frequency is approximately 22.5 MHz. In other embodiments, the Center Frequency can be any frequency that is below one half of the frequency of the input data stream.

It should also be noted that some embodiments of the present invention described above can be implemented by hardware logic (e.g., Field Programmable Gate Array(s)). However, a person skilled in the art would realize that portions of the present invention can be implemented as computer executable programs executable by a digital signal processor.

What is claimed is:

1. A signal encoder for use in a cable television return path and configured to receive a first stream of digital samples from an analog-to-digital converter, the first stream of digital samples being representative of an analog return path signal that is sampled at a first data rate, the signal encoder comprising:
   a bandpass interpolation filter configured to receive the first stream of digital samples and to substantially remove signals outside of a predetermined frequency band;
   up-sampling logic configured to up-sample outputs of the bandpass interpolation filter and to generate a second stream of digital samples at a second data rate, the second data rate being a predetermined multiple of a center frequency of the predetermined frequency band;
   separation logic configured to separate the second stream of digital samples into a third stream of digital samples and a fourth stream of digital samples, the third stream and the fourth stream each having a data rate that is one half of the second data rate;
   a first interpolation filter configured to interpolate the third stream;
   a second interpolation filter configured to interpolate the fourth stream; and
   down-sampling logic configured to select digital samples from the outputs of the interpolation filters and to interleave the selected digital samples to form a fifth stream of digital samples, the fifth stream having a third data rate that is higher than four times the bandwidth of the predetermined frequency band but lower than the first data rate.

2. The signal encoder of claim 1, wherein the second data rate is four times the center frequency of the predetermined frequency band.

3. The signal encoder of claim 1, wherein the up-sampling logic comprises a numerically controlled oscillator coupled to multiple phase taps of the bandpass interpolation filter.

4. The signal encoder of claim 1, wherein the separation logic comprises:
   a waveform generator configured to generate a first waveform and a secondwaveform that is 90° out-of-phase of the first waveform, the first waveform and the second waveform both having the center frequency and having a data rate four times of the center frequency;
   a first digital multiplier configured to multiply the second stream with the first waveform and to generate the third stream of digital samples; and
   a second digital multiplier configured to multiply the second stream with the second waveform and to generate the fourth stream of digital samples.

5. The signal encoder of claim 1, wherein the down-sampling logic comprises a numerically controlled oscillator having a frequency that is at least twice the bandwidth of the predetermined frequency band.

6. The signal encoder of claim 1, wherein the center frequency is below one half of the first data rate.

7. The signal encoder of claim 1, wherein the bandwidth of the predetermined frequency band is approximately 6 MHz, and wherein the third data rate is approximately 24 MHz.

8. A device for use in a cable television return path, comprising:
   an analog-to-digital converter configured to convert an analog return signal to a first stream of digital samples at a first data rate;
   a bandpass interpolation filter configured to receive the first stream of digital samples and to substantially remove signals outside of a predetermined frequency band;
   up-sampling logic configured to up-sample outputs of the bandpass interpolation filter and to generate a second stream of digital samples at a second data rate, the second data rate being a predetermined multiple of a center frequency of the predetermined frequency band;
   separation logic configured to separate the second stream of digital samples into a third stream of digital samples and a fourth stream of digital samples, the third stream and the fourth stream each having a data rate that is one half of the second data rate;
   a first interpolation filter configured to interpolate the third stream;
   a second interpolation filter configured to interpolate the fourth stream;
   down-sampling logic configured to select digital samples from the outputs of the interpolation filters and to interleave the selected digital samples to form a fifth stream of digital samples, the fifth stream having a third data rate that is higher than four times the bandwidth of the predetermined frequency band but lower than the first data rate; and
   a serializer configured to convert the fifth stream of digital samples to a serial bit stream;
   an optical transmitter driven by the serial bit stream to generate an optical signal for transmission in the return path of the cable television system.

9. The device of claim 8, wherein the second data rate is four times the center frequency of the predetermined frequency band.

10. The device of claim 8, wherein the up-sampling logic comprises a numerically controlled oscillator coupled to multiple phase taps of the bandpass interpolation filter.

11. The device of claim 8, wherein the separation logic comprises:
- a waveform generator configured to generate a first waveform and a second waveform that is 90° out-of-phase of the first waveform, the first waveform and the second waveform both having the center frequency and having a data rate four times of the center frequency;
- a first digital multiplier configured to multiply the second stream with the first waveform and to generate the third stream of digital samples; and
- a second digital multiplier configured to multiply the second stream with the second waveform and to generate the fourth stream of digital samples.

12. The device of claim 8, wherein the down-sampling logic comprises a numerically controlled oscillator having a frequency that is at least twice the bandwidth of the predetermined frequency band.

13. The device of claim 8, wherein the center frequency is below one half of the first data rate.

14. The device of claim 8, wherein the bandwidth of the predetermined frequency band is approximately 6 MHz, and wherein the third data rate is approximately 24 MHz.

15. A method of transmitting analog return signals in a digital return path of a cable television system, the method comprising:
- converting an analog return signal to a first stream of digital samples at a first data rate;
- filtering the first stream of digital samples to substantially remove signals outside of a predetermined frequency band;
- up-sampling the filtered stream of digital samples to generate a second stream of digital samples at a second data rate, the second data rate being a predetermined multiple of a center frequency of a predetermined frequency band;
- separating the second stream of digital samples into a third stream of digital samples and a fourth stream of digital samples, the third stream and the fourth stream each having a data rate that is one half of the second data rate;
- interpolation filtering the third stream and the fourth stream;
- down-sampling the filtered third stream and the filtered fourth stream of digital samples;
- interleaving digital samples from the down-sampled streams to form a fifth stream of digital samples, the fifth stream having a third data rate that is higher than four times the bandwidth of the predetermined frequency band but lower than the first data rate;
- converting the fifth stream of digital samples to an optical signal for transmission in the return path of the cable television system.

16. The method of claim 15, further comprising:
- converting the optical signal to a sixth stream of digital samples;
- deinterleaving the sixth stream of digital samples and generate a stream of first digital samples and a stream of second digital samples;
- interpolation filtering the stream of first digital samples and the stream of second digital samples;
- up-sampling the filtered streams of first digital samples and second digital samples to form a first up-sampled stream and a second up-sampled stream of digital samples, the first up-sampled stream and the second up-sampled stream both having a data rate that is a predetermined multiple of a center frequency of the predetermined frequency band;
- combining the first up-sampled stream and the second up-sampled stream to generate a combined stream of digital samples;
- filtering the combined stream to generate an output stream of digital samples at an output data rate higher than that of the sixth stream of digital samples; and
- converting the output stream of digital samples to an analog signal that is representative of signal components of the analog return signal within the predetermined frequency band.

* * * * *